(12) United States Patent
Bilen et al.

(10) Patent No.: US 10,569,370 B2
(45) Date of Patent: Feb. 25, 2020

(54) MECHANICAL LOCKING MECHANISM USING SHAPE MEMORY MATERIALS

(71) Applicant: Baker Hughes Incorporated, Houston, TX (US)

(72) Inventors: Juan Miguel Bilen, The Woodlands, TX (US); Bo Yu, Spring, TX (US); Kenneth R. Evans, Sugar Land, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 242 days.

(21) Appl. No.: 15/434,206

(22) Filed: Feb. 16, 2017

(65) Prior Publication Data

US 2018/0073303 A1  Mar. 15, 2018

Related U.S. Application Data

(63) Continuation-in-part of application No. 15/262,893, filed on Sep. 12, 2016, now Pat. No. 10,508,323.

(51) Int. Cl.
| | |
|---|---|
| *B23P 11/02* | (2006.01) |
| *E21B 10/567* | (2006.01) |
| *C22F 1/00* | (2006.01) |
| *C22C 19/03* | (2006.01) |

(52) U.S. Cl.
CPC ............. *B23P 11/025* (2013.01); *B23P 11/02* (2013.01); *C22C 19/03* (2013.01); *C22F 1/006* (2013.01); *E21B 10/567* (2013.01)

(58) Field of Classification Search
CPC ....... F16B 1/0014; B23P 11/02; B23P 11/025; E21B 33/124; E21B 33/128; E21B 33/146; C22C 19/03
See application file for complete search history.

(56) References Cited

U.S. PATENT DOCUMENTS

| | | | | |
|---|---|---|---|---|
| 3,900,939 | A | * | 8/1975 | Greacen ................. B21D 39/06 138/89 |
| 4,597,632 | A | * | 7/1986 | Mallinson ............. B23P 11/025 385/72 |
| 4,637,436 | A | * | 1/1987 | Stewart, Jr. ............ B21D 39/06 138/89 |
| 4,743,079 | A | * | 5/1988 | Bloch ................... F16B 1/0014 285/308 |
| 4,754,538 | A | * | 7/1988 | Stewart, Jr. ............ B21D 39/06 165/76 |
| 5,037,233 | A | * | 8/1991 | Nishihara ............. F16B 11/008 285/381.2 |
| 5,040,283 | A | * | 8/1991 | Pelgrom ............... B23P 11/025 138/97 |

(Continued)

*Primary Examiner* — Daniel J Wiley
(74) *Attorney, Agent, or Firm* — Shawn Hunter

(57) ABSTRACT

A fastening apparatus includes a retaining member comprising a shape memory material configured to transform, responsive to application of a stimulus, from a first solid phase to a second solid phase. The retaining member is disposed within a hole in a body and secured within the hole by phase change which creates an interference fit to secure the retaining member against rotational and axial movement. The hole has a second axial cross-sectional shape. The retaining member has a first axial cross-sectional shape that is preferably either circular or rectangular.

16 Claims, 14 Drawing Sheets

(56) References Cited

U.S. PATENT DOCUMENTS

| | | | | |
|---|---|---|---|---|
| 5,395,193 | A * | 3/1995 | Krumme | F16B 1/0014 29/20 |
| 5,507,826 | A * | 4/1996 | Besselink | A61B 17/7001 606/78 |
| 5,536,126 | A * | 7/1996 | Gross | B23P 11/025 411/15 |
| 5,662,362 | A * | 9/1997 | Kapgan | F16L 13/004 285/381.1 |
| 5,678,645 | A * | 10/1997 | Tibbitts | E21B 10/5673 175/426 |
| 5,722,709 | A * | 3/1998 | Lortz | F03G 7/06 294/82.24 |
| 5,858,020 | A * | 1/1999 | Johnson | A61F 2/36 606/78 |
| 6,749,376 | B2 * | 6/2004 | Keefe | B23B 31/117 407/119 |
| 8,225,478 | B2 * | 7/2012 | Kane | F16C 35/077 29/447 |
| 8,388,292 | B2 * | 3/2013 | Kirkwood | F16B 1/0014 411/351 |
| 8,579,535 | B2 * | 11/2013 | Crane | F16B 1/0014 403/28 |
| 9,180,525 | B2 * | 11/2015 | Park | B23B 31/02 |
| 9,422,964 | B2 * | 8/2016 | Rule | F16B 19/06 |
| 2002/0062547 | A1 * | 5/2002 | Chiodo | B09B 5/00 29/426.5 |
| 2006/0019510 | A1 * | 1/2006 | Rudduck | F16B 1/0014 439/74 |
| 2012/0312599 | A1 * | 12/2012 | Trinh | E21B 10/43 175/57 |
| 2014/0248106 | A1 * | 9/2014 | Rule | F16B 19/06 411/504 |

\* cited by examiner

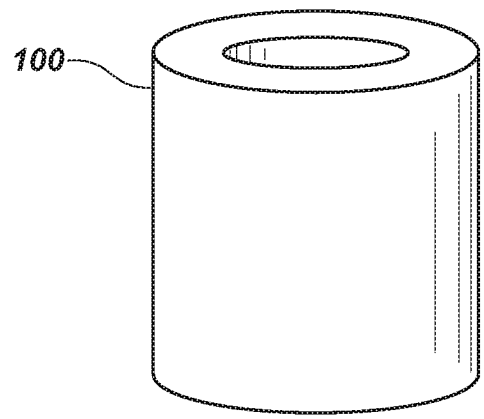
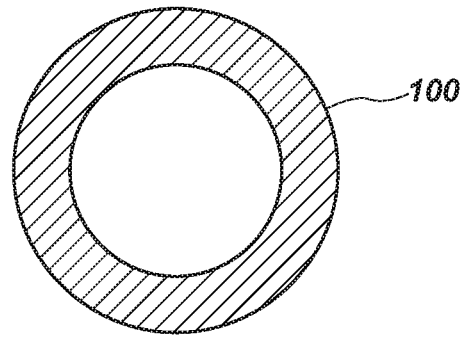
FIG.2A  FIG.2B
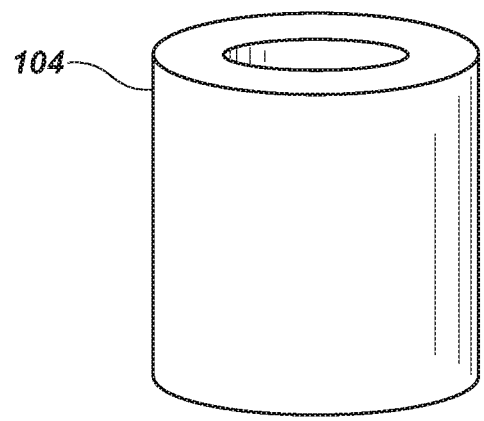
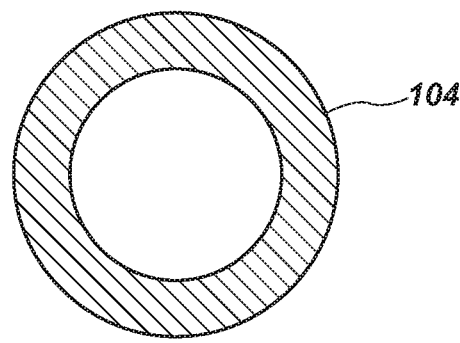
FIG.3A  FIG.3B

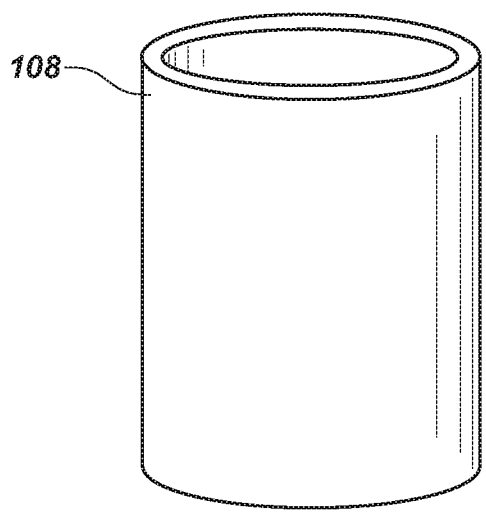
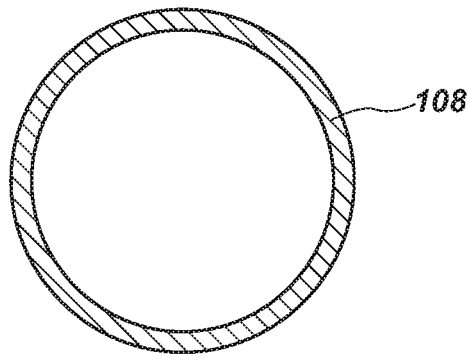
FIG.4A            FIG.4B
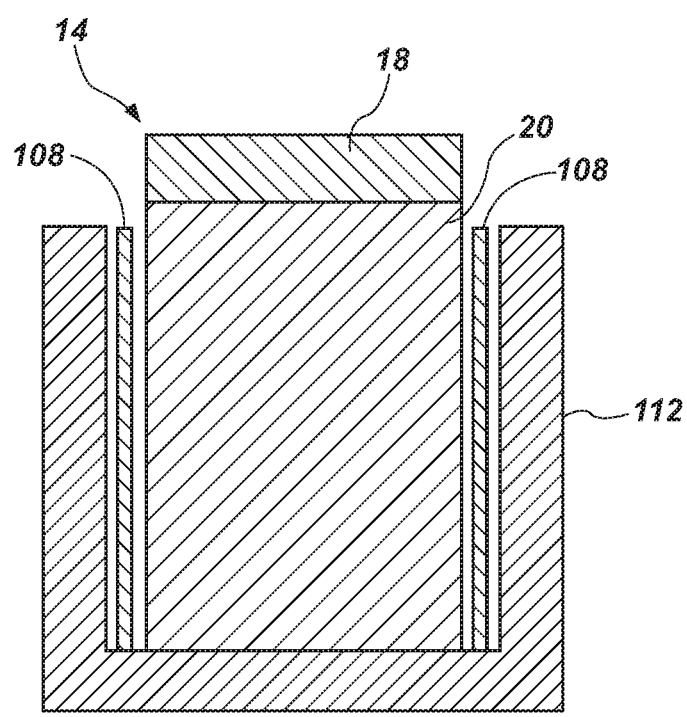
FIG.5

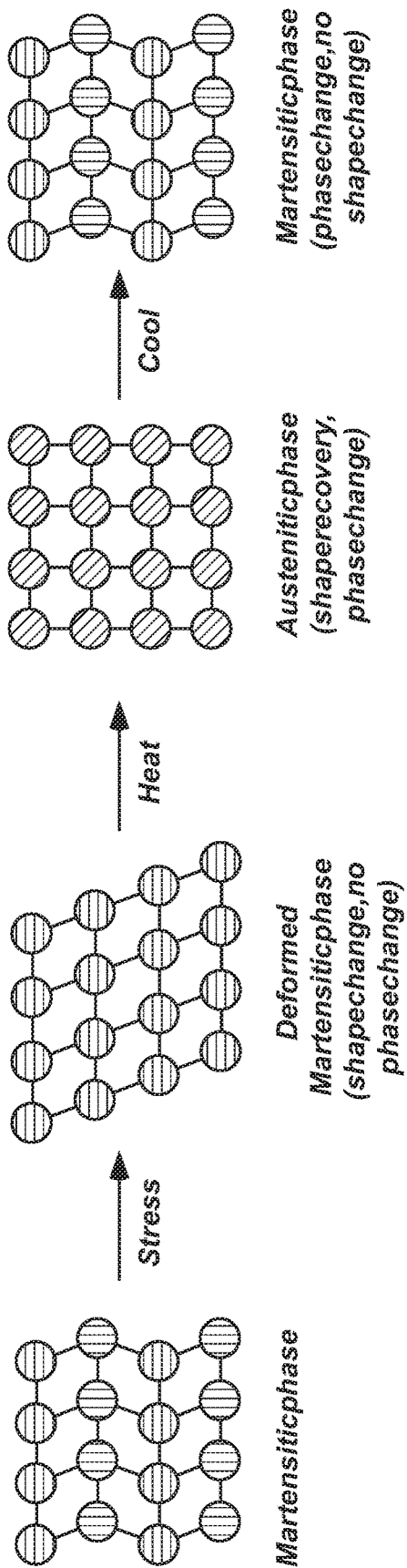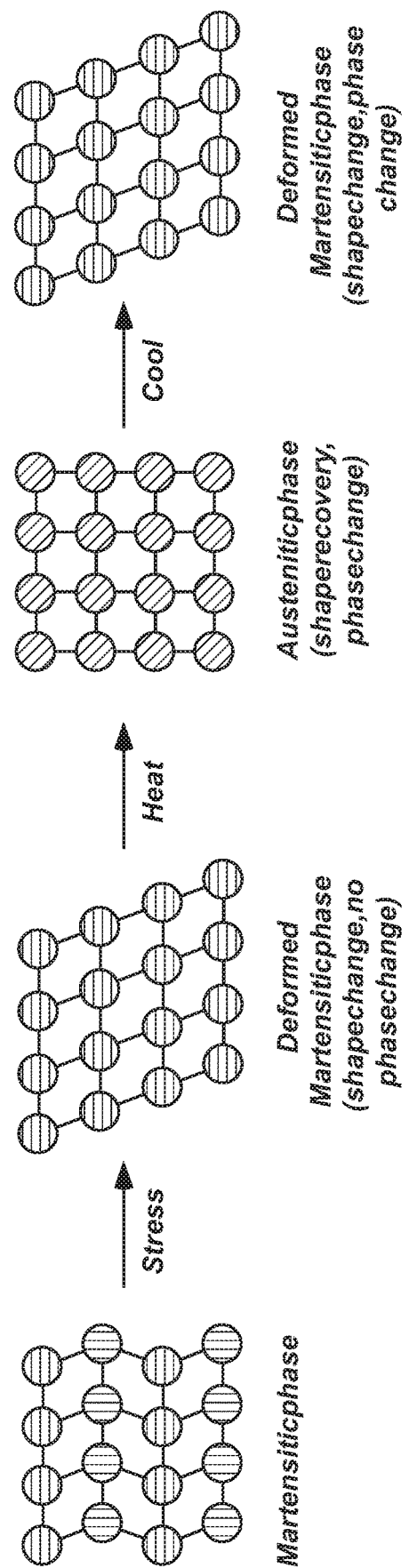

MECHANICAL LOCKING MECHANISM USING SHAPE MEMORY MATERIALS

CROSS-REFERENCE TO RELATED APPLICATIONS

This application is a continuation-in-part of U.S. patent application Ser. No. 15/262,893, "Method and Apparatus for Securing Bodies Using Shape Memory Materials," filed Sep. 12, 2016.

The subject matter of this application is related to the subject matter of U.S. patent application Ser. No. 15/002,211, "Earth-Boring Tools and Methods of Forming Earth-Boring Tools Using Shape Memory Materials," filed Jan. 20, 2016; U.S. patent application Ser. No. 15/002,230, "Earth-Boring Tools, Depth-of-Cut Limiters, and Methods of Forming or Servicing a Wellbore," filed Jan. 20, 2016; and U.S. patent application Ser. No. 15/002,189, "Nozzle Assemblies Including Shape Memory Materials for Earth-Boring Tools and Related Methods," filed Jan. 20, 2016; the entire disclosure of each of which is hereby incorporated herein by this reference.

FIELD

Embodiments of the present disclosure relate generally to fasteners including shape memory materials, tools for forming or servicing a wellbore, and related methods.

BACKGROUND

Cutting elements used in earth boring tools often include polycrystalline diamond compact (often referred to as "PDC") cutting elements, which are cutting elements that include cutting faces of a polycrystalline diamond material. Polycrystalline diamond (often referred to as "PCD") material is material that includes inter-bonded grains or crystals of diamond material. In other words, PCD material includes direct, intergranular bonds between the grains or crystals of diamond material.

PDC cutting elements are formed by sintering and bonding together relatively small diamond grains under conditions of high temperature and high pressure in the presence of a catalyst (for example, cobalt, iron, nickel, or alloys or mixtures thereof) to form a layer or "table" of polycrystalline diamond material on a cutting element substrate. These processes are often referred to as high-temperature/high-pressure (or "HTHP") processes. The cutting element substrate may include a cermet material (i.e., a ceramic-metal composite material) such as cobalt-cemented tungsten carbide. In such instances, the cobalt (or other catalyst material) in the cutting element substrate may diffuse into the diamond grains during sintering and serve as the catalyst for forming the intergranular diamond-to-diamond bonds, and the resulting diamond table, from the diamond grains. In other methods, powdered catalyst material may be mixed with the diamond grains prior to sintering the grains together in an HTHP process.

Upon formation of a diamond table using an HTHP process, catalyst material may remain in interstitial spaces between the grains of diamond in the resulting polycrystalline diamond table. The presence of the catalyst material in the diamond table may contribute to thermal damage in the diamond table when the cutting element is heated during use, due to friction at the contact point between the cutting element and the rock formation being cut.

PDC cutting elements in which the catalyst material remains in the diamond table are generally thermally stable up to a temperature of about 750° C., although internal stress within the cutting element may begin to develop at temperatures exceeding about 400° C. due to a phase change that occurs in cobalt at that temperature (a change from the "beta" phase to the "alpha" phase). Also beginning at about 400° C., an internal stress component arises due to differences in the thermal expansion of the diamond grains and the catalyst material at the grain boundaries. This difference in thermal expansion may result in relatively large tensile stresses at the interface between the diamond grains, and may contribute to thermal degradation of the microstructure when PDC cutting elements are used in service. Differences in the thermal expansion between the diamond table and the cutting element substrate to which it is bonded may further exacerbate the stresses in the polycrystalline diamond compact. This differential in thermal expansion may result in relatively large compressive and/or tensile stresses at the interface between the diamond table and the substrate that eventually leads to the deterioration of the diamond table, causes the diamond table to delaminate from the substrate, or results in the general ineffectiveness of the cutting element.

Furthermore, at temperatures at or above about 750° C., some of the diamond crystals within the diamond table may react with the catalyst material, causing the diamond crystals to undergo a chemical breakdown or conversion to another allotrope of carbon. For example, the diamond crystals may graphitize at the diamond crystal boundaries, which may substantially weaken the diamond table. Also, at extremely high temperatures, in addition to graphite, some of the diamond crystals may be converted to carbon monoxide or carbon dioxide.

In order to reduce the problems associated with differences in thermal expansion and chemical breakdown of the diamond crystals in PDC cutting elements, so called "thermally stable" polycrystalline diamond compacts (which are also known as thermally stable products, or "TSPs") have been developed. Such a TSP may be formed by leaching the catalyst material (e.g., cobalt) out from interstitial spaces between the inter-bonded diamond crystals in the diamond table using, for example, an acid or combination of acids (e.g., aqua regia). A substantial amount of the catalyst material may be removed from the diamond table, or catalyst material may be removed from only a portion thereof. TSPs in which substantially all catalyst material has been leached out from the diamond table have been reported to be thermally stable up to temperatures of about 1,200° C. It has also been reported, however, that such fully leached diamond tables are relatively more brittle and vulnerable to shear, compressive, and tensile stresses than are non-leached diamond tables. In addition, it may be difficult to secure a completely leached diamond table to a supporting substrate.

Cutting elements are typically mounted on a drill bit body by brazing. The drill bit body is formed with recesses therein for receiving a substantial portion of the cutting element in a manner which presents the PCD layer at an appropriate angle and direction for cutting in accordance with the drill bit design. In such cases, a brazing compound is applied to the surface of the backing and in the recess on the bit body in which the cutting element is received. The cutting elements are installed in their respective recesses in the bit body, and heat is applied to each cutting element via a torch to raise the temperature to a point which is high enough to braze the cutting elements to the bit body but not so high as to damage the PCD layer.

BRIEF SUMMARY

In some embodiments, an earth-boring tool includes a tool body, at least one cutting element and a retaining member comprising a shape memory material located between a surface of the tool body and a surface of the at least one cutting element. The shape memory material is configured to transform, responsive to application of a stimulus, from a first solid phase to a second solid phase. The retaining member comprises the shape memory material in the second solid phase, and at least partially retains the at least one cutting element adjacent the tool body.

A method of forming an earth-boring tool includes disposing a retaining member comprising a shape memory material in a space between a cutting element and a tool body and transforming the shape memory material from a first solid phase to a second solid phase by application of a stimulus to create a mechanical interference between the cutting element, the retaining member, and the tool body to secure the cutting element to the tool body.

In other embodiments, a method of forming an earth-boring tool includes training a shape memory material in a first solid phase to a first shape, training the shape memory material in a second solid phase to a second shape such that the retaining member comprising the shape memory material exhibits a dimension larger in at least one direction than in the at least one direction when in the first phase, transforming the shape memory material to the first solid phase, disposing the retaining member comprising the shape memory material in the first solid phase at least partially within the space between a cutting element and a tool body, and transforming the shape memory material to the second solid phase to secure the cutting element to the tool body.

In some embodiments, a tool for forming or servicing a wellbore includes a first body, a second body, and a retaining member located between a surface of the first body and a surface of the second body. The retaining member at least partially retains the second body with respect to the first body. The retaining member comprises a shape memory material configured to transform, responsive to application of a stimulus, from a first solid phase to a second solid phase.

In some embodiments, a method of forming a tool for forming or servicing a wellbore includes disposing a retaining member comprising a shape memory material in a space between a first body and a second body. The method further includes transforming the shape memory material from a first solid phase to a second solid phase by application of a stimulus to cause the retaining member to create a mechanical interference between the first body, the retaining member, and the second body to secure the first body to the second body.

In other embodiments, a fastening apparatus includes a body comprising a shape memory material. The body has at least a first cross sectional area and a second cross sectional area measured perpendicular to a longitudinal axis of the body. The second cross sectional area is smaller than the first cross sectional area. The shape memory material is configured to transform, responsive to application of a stimulus, from a first solid phase to a second solid phase.

According to other embodiments, a fastening apparatus includes a retaining member that is formed of shape memory material. The retaining member has a first axial cross-sectional shape. In preferred embodiments, the first axial cross-sectional shape is circular or rectangular. In other embodiments, however, the first axial cross-sectional shape may be a polygonal or other non-circular shape. A hole is formed within a body, and the hole presents a second cross-sectional shape that is preferably rectangular. However, the second cross-sectional shape might have other polygonal or non-circular shapes. When the shape memory material is transformed to the second solid phase, the retaining member is secured within the hole against rotational and axial movement.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

FIG. 2A is a simplified perspective side view of a shape memory material for use in an earth-boring tool;

FIG. 2B is a simplified end view of the shape memory material shown in FIG. 2A;

FIG. 3A is a simplified perspective side view of the shape memory material shown in FIG. 2A after a phase transition;

FIG. 3B is a simplified end view of the shape memory material shown in FIG. 3A;

FIG. 4A is a simplified perspective side view of the shape memory material shown in FIG. 3A after training;

FIG. 4B is a simplified end view of the shape memory material shown in FIG. 4A;

FIG. 5 is a simplified side cutaway view of the shape memory material shown in FIG. 4A in an earth-boring tool;

FIGS. 10A and 10B are simplified diagrams illustrating how the microstructure of a shape memory material may change in processes disclosed herein;

DETAILED DESCRIPTION

The illustrations presented herein are not actual views of any particular cutting element, insert, or drill bit, but are merely idealized representations employed to describe example embodiments of the present disclosure. Additionally, elements common between figures may retain the same numerical designation.

As used herein, the term "hard material" means and includes any material having a Knoop hardness value of about 1,000 Kg/mm² (9,807 MPa) or more. Hard materials include, for example, diamond, cubic boron nitride, boron carbide, tungsten carbide, etc.

As used herein, the term "intergranular bond" means and includes any direct atomic bond (e.g., covalent, metallic, etc.) between atoms in adjacent grains of material.

As used herein, the term "polycrystalline hard material" means and includes any material comprising a plurality of grains or crystals of the material that are bonded directly together by intergranular bonds. The crystal structures of the individual grains of polycrystalline hard material may be randomly oriented in space within the polycrystalline hard material.

As used herein, the term "polycrystalline compact" means and includes any structure comprising a polycrystalline hard material comprising intergranular bonds formed by a process that involves application of pressure (e.g., compaction) to the precursor material or materials used to form the polycrystalline hard material.

As used herein, the term "earth-boring tool" means and includes any type of bit or tool used for drilling during the formation or enlargement of a wellbore and includes, for example, rotary drill bits, percussion bits, core bits, eccentric bits, hi-center bits, reamers, mills, drag bits, roller-cone bits, hybrid bits, and other drilling bits and tools known in the art.

Figure 1:
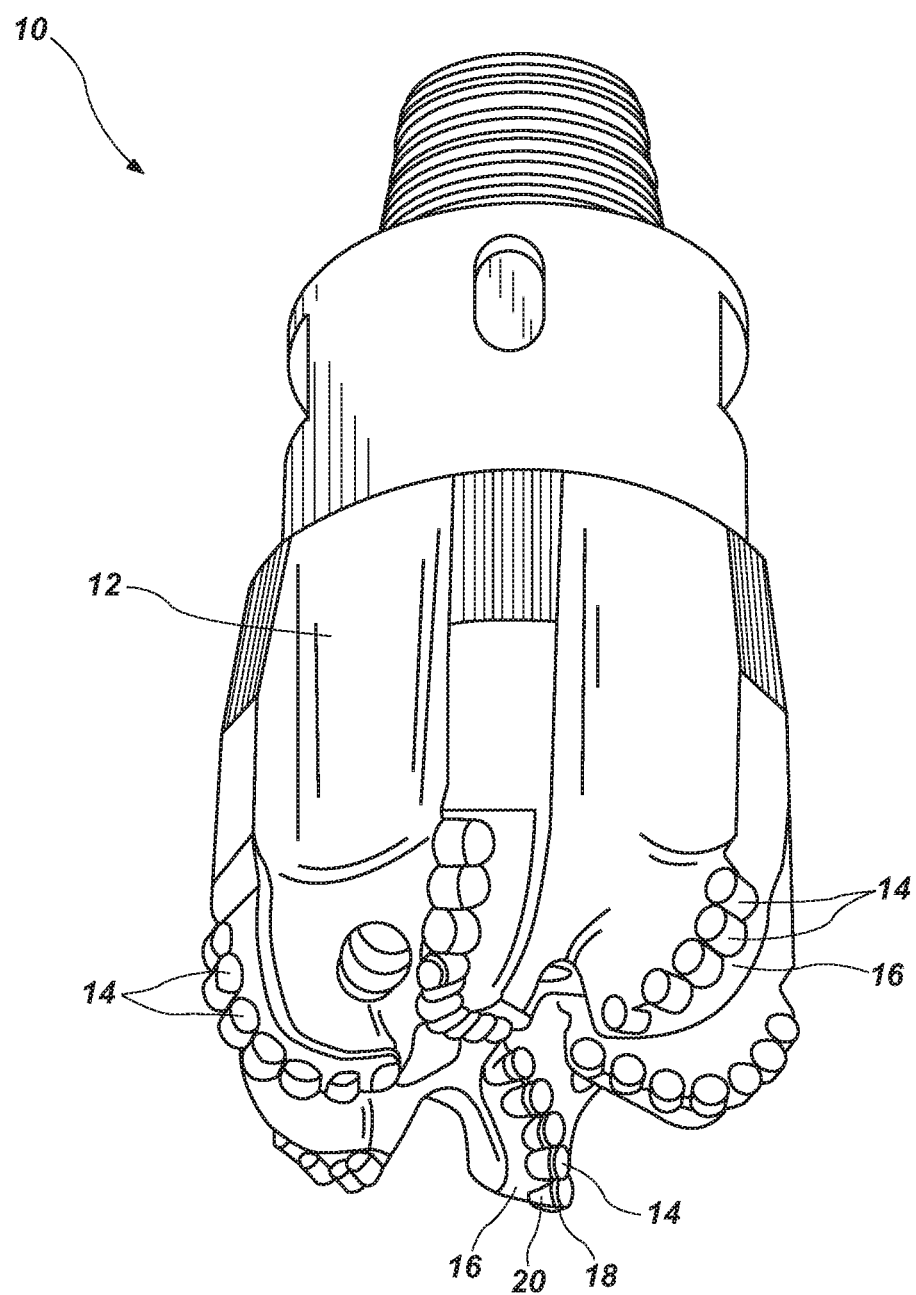
FIG. 1 illustrates an earth-boring rotary drill bit comprising cutting elements secured with shape memory material as described herein.

FIG. 1 illustrates a fixed-cutter earth-boring rotary drill bit 10. The drill bit 10 includes a bit body 12. One or more cutting elements 14 as described herein may be mounted on the bit body 12 of the drill bit 10, such as on blades 16. The cutting elements 14 may optionally be secured within pockets formed in the outer surface of the bit body 12. Other types of earth-boring tools, such as roller cone bits, percussion bits, hybrid bits, reamers, etc., also may include cutting elements 14 as described herein.

The cutting elements 14 may include a polycrystalline hard material 18. Typically, the polycrystalline hard material 18 may include polycrystalline diamond, but may include other hard materials instead of or in addition to polycrystalline diamond. For example, the polycrystalline hard material 18 may include cubic boron nitride. Optionally, cutting elements 14 may also include substrates 20 to which the polycrystalline hard material 18 is bonded, or on which the polycrystalline hard material 18 is formed in an HPHT process. For example, a substrate 20 may include a generally cylindrical body of cobalt-cemented tungsten carbide material, although substrates of different geometries and compositions may also be employed. The polycrystalline hard material 18 may be in the form of a table (i.e., a layer) of polycrystalline hard material 18 on the substrate 20, as shown in FIG. 1. The polycrystalline hard material 18 may be provided on (e.g., formed on or secured to) a surface of the substrate 20. In additional embodiments, the cutting elements 14 may simply be volumes of the polycrystalline hard material 18 having any desirable shape, and may not include any substrate 20. The cutting elements 14 may be referred to as "polycrystalline compacts," or, if the polycrystalline hard material 18 includes diamond, as "polycrystalline diamond compacts."

The polycrystalline hard material 18 may include interspersed and inter-bonded grains forming a three-dimensional network of hard material. Optionally, in some embodiments, the grains of the polycrystalline hard material 18 may have a multimodal (e.g., bi-modal, tri-modal, etc.) grain size distribution.

The drill bit 10 shown in FIG. 1 may include a shape memory material (not shown in FIG. 1) between a surface of the bit body 12 and a surface of one or more of the cutting element 14. The shape memory material may at least partially retain the cutting element 14. In other words, the shape memory material may be used to create mechanical interference between the shape memory material and each of the bit body 12 and the cutting element 14, and the mechanical interference may at least partially retain the cutting element 14 in position on the bit body 12.

FIG. 2A is a simplified perspective side view of a retaining member 100, which may be used to secure a cutting element 14 (FIG. 1) to a bit body 12 (FIG. 1) of an earth-boring tool. The retaining member 100 may be or include a shape memory material. FIG. 2B is a simplified end view of the retaining member 100 shown in FIG. 2A. As shown in FIGS. 2A and 2B, the retaining member 100 may be in the form of an annular sleeve configured to surround a cutting element 14. In some embodiments, the retaining member 100 may include a metal alloy or a polymer.

The retaining member 100 may include any suitable shape memory material, including shape memory metal alloys and shape memory polymers. Shape memory metal alloys may include Ni-based alloys, Cu-based alloys, Co-based alloys, Fe-based alloys, Ti-based alloys, Al-based alloys, or any mixture thereof. For example, a shape memory metal alloy may include a 50:50 mixture by weight of nickel and titanium, a 55:45 mixture by weight of nickel and titanium, or a 60:40 mixture by weight of nickel and titanium. Many other compositions are possible and can be selected based on tool requirements and material properties as known in the art. Shape memory polymers may include, for example, epoxy polymers, thermoset polymers, thermoplastic polymers, or combinations or mixtures thereof. Other polymers that exhibit shape memory behavior may also be employed. Shape memory materials are polymorphic and may exhibit two or more crystal structures or phases. Shape memory materials may further exhibit a shape memory effect associated with the phase transition between two crystal structures or phases, such as austenite and martensite. The austenitic phase exists at elevated temperatures, while the martensitic phase exists at low temperatures. The shape memory effect may be triggered by a stimulus that may be thermal, electrical, magnetic, or chemical, and which causes a transition from one solid phase to another.

By way of non-limiting example, a shape memory alloy may transform from an original austenitic phase (i.e., a high-temperature phase) to a martensitic phase (i.e., a low-temperature phase) upon cooling. The phase transformation from austenite to martensite may be spontaneous, diffusionless, and temperature dependent. The transition temperatures from austenite to martensite and vice versa vary for different shape memory alloy compositions. The phase transformation from austenite to martensite occurs between a first temperature ($M_s$), at which austenite begins to transform to martensite and a second, lower temperature ($M_f$), at which only martensite exists. With reference to FIG. 10A, initially, the crystal structure of martensite is heavily twinned and may be deformed by an applied stress such that the material takes on a new size and/or shape. After the applied stress is removed, the material retains the deformed size and/or shape. However, upon heating, martensite may transform and revert to austenite. The phase transformation occurs between a first temperature ($A_s$) at which martensite begins to transform to austenite and a second, higher temperature ($A_f$) at which only austenite exists. Upon a complete transition to austenite, the element returns to its original "remembered" size and/or shape. As used herein, the term "remembered" refers to a state to which a material returns spontaneously responsive to a temperature change. Upon a second cooling process and transformation from austenite to martensite, the crystal structure of the martensitic phase is heavily twinned and may be deformed by an applied stress such that the material takes on at least one of a new size and/or shape. The size and/or shape of the material in the previously deformed martensitic phase are not remembered from the initial cooling process. This shape memory effect may be referred to as a one-way shape memory effect, such that the element exhibits the shape memory effect only upon heating as illustrated in FIG. 10A.

Other shape memory alloys possess two-way shape memory, such that a material comprising such a shape memory alloy exhibits this shape memory effect upon heating and cooling. Shape memory alloys possessing two-way shape memory effect may, therefore, include two remembered sizes and shapes—a martensitic (i.e., low-temperature) shape and an austenitic (i.e., high-temperature) shape. Such a two-way shape memory effect is achieved by "training." By way of example and not limitation, the remembered austenitic and martensitic shapes may be created by inducing non-homogeneous plastic strain in a martensitic or austenitic phase, by aging under an applied stress, or by thermomechanical cycling. With reference to FIG. 10B, when a two-way shape memory alloy is cooled from an austenitic to a martensitic phase, some martensite configurations might be favored, so that the material may tend to adopt a preferred shape. By way of further non-limiting example, and without being bound by any particular theory, the applied stress may create permanent defects, such that the deformed crystal structure of the martensitic phase is remembered. After the applied stress is removed, the element retains the deformed size and/or shape. Upon heating, martensite may transform and revert to austenite between the first temperature ($A_s$) and the second, higher temperature ($A_f$). Upon a complete transition to austenite, the element returns to its original remembered size and shape. The heating and cooling procedures may be repeated such that the material transforms repeatedly between the remembered martensitic and the remembered austenitic shapes.

A shape memory polymer may exhibit a similar shape memory effect. Heating and cooling procedures may be used to transition a shape memory polymer between a hard solid phase and a soft solid phase by heating the polymer above, for example, a melting point or a glass transition temperature ($T_g$) of the shape memory polymer and cooling the polymer below the melting point or glass transition temperature ($T_g$) as taught in, for example, U.S. Pat. No. 6,388,043, issued May 14, 2002, and titled "Shape Memory Polymers," the entire disclosure of which is incorporated herein by this reference. The shape memory effect may be triggered by a stimulus which may be thermal, electrical, magnetic, or chemical.

Though discussed herein as having one or two remembered shapes, shape memory materials may have any number of phases, and may be trained to have a selected remembered shape in any or all of the phases.

The retaining member 100 as shown in FIGS. 2A and 2B may include a shape memory alloy in an austenitic phase. The retaining member 100 may have one or more dimensions that would cause an interference fit between the cutting element 14 and the bit body 12 (FIG. 1). For example, if the cutting element 14 is approximately cylindrical and the retaining member 100 forms an annular sleeve, the inside diameter of the annular sleeve (before the drill bit 10 is assembled) may be slightly smaller than the outside diameter of the cutting element 14. For example, the inside diameter of the retaining member 100 may be from about 0.001 in (0.0254 mm) to about 0.040 in (1.02 mm) smaller than the outside diameter of the cutting element 14, such as from about 0.005 in (0.127 mm) to about 0.010 in (0.254 mm) smaller than the outside diameter of the cutting element 14. In some embodiments, the cutting element 14, the bit body 12, and/or the retaining member 100 may include ridges or other textured surfaces to improve retention or alignment of the cutting element 14 within the bit body 12.

The retaining member 100 may be converted to another solid phase to form the retaining member 104 shown in FIGS. 3A and 3B. The retaining member 104 may have dimensions similar or identical to the dimensions of the retaining member 100 shown in FIGS. 2A and 2B. In some embodiments, the retaining member 104 may include a shape memory alloy in a martensitic phase. The retaining member 100 (FIGS. 2A and 2B) may be converted to the retaining member 104 (FIGS. 3A and 3B) by cooling, such as by cooling below $M_f$ for the material.

The retaining member 104 may be trained or deformed to form a retaining member 108, shown in FIGS. 4A and 4B, having different dimensions, without changing the phase of the retaining member 104. For example, the retaining member 108 may have a larger inside diameter, a smaller outside diameter, a longer length, or any other selected dimensional difference from the retaining member 104.

The retaining member 108 may have dimensions such that the retaining member 108 may be disposed in a cavity adjacent the cutting element 14 and the bit body 12 (FIG. 1). For example, FIG. 5 illustrates that the retaining member 108 may be between an outer surface of the cutting element 14 and an inner surface of a body 112 (which may be, for example, a blade 16 or another portion of the bit body 12). The body 112 may define a pocket shaped generally to fit the cutting element 14 with a thin gap to allow the retaining member 108 to move freely or snugly into and out of the gap. The retaining member 108 may partially or completely surround the cutting element 14. For example, the retaining member 108 may surround the substrate 20.

Figure 6:
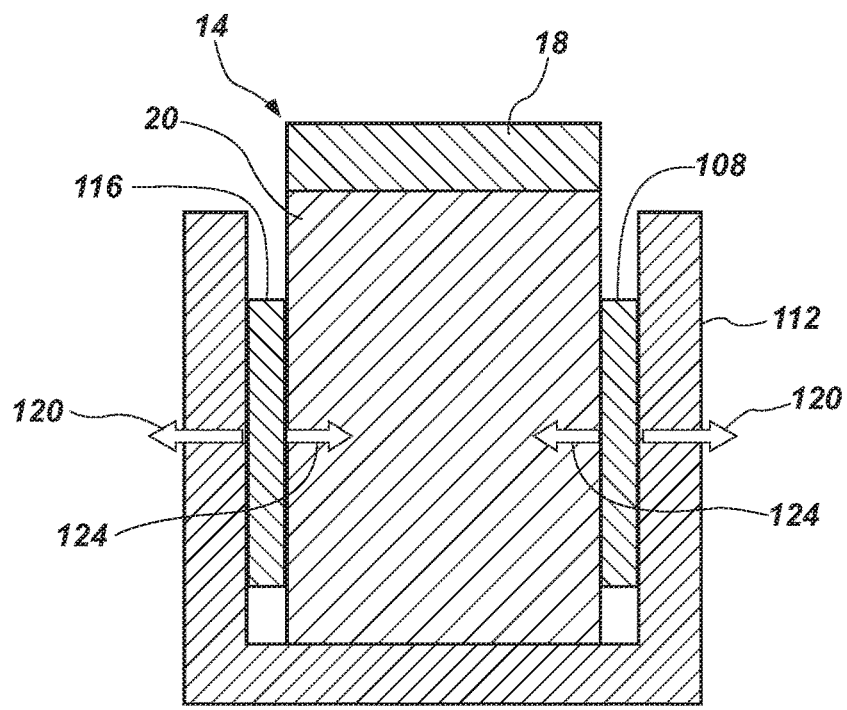
FIG. 6 is a simplified side view of the earth-boring tool shown in FIG. 5 after a phase transition of the shape memory material.

As shown in FIG. 6, after the retaining member 108 is placed adjacent the cutting element 14 and the body 112, the retaining member 108 may be converted to a different solid phase to form a retaining member 116. The retaining member 116 may be a material of the same phase as the material of the retaining member 100 shown in FIGS. 2A and 2B. For example, the retaining member 116 may include a shape memory alloy in an austenitic phase. The conversion may occur due to a stimulus. The stimulus may be a change in temperature (e.g., heating above $A_f$), an electrical current, a magnetic field, or a chemical signal. In some embodiments, an electrical current may pass through the retaining member 108 to cause the retaining member 108 to undergo Joule heating. This heating may raise the temperature of the retaining member 108 above $A_f$ without significantly raising the temperature of the body 112 or the cutting element 14 therein. For example, the cutting element 14 may be maintained at a temperature below about 400° C., below about 300° C., or even below about 200° C. during the phase transition. If the polycrystalline hard material 18 of the cutting element 14 includes diamond, heating of the retaining member 108 may avoid problems associated with overheating the diamond (e.g., back-graphitization, stresses from expansion, etc.) because the temperature at which the phase transition occurs may be lower than the temperature at which diamond tends to degrade.

The retaining member 116 may have approximately the same dimensions as the retaining member 100 shown in FIGS. 2A and 2B, but for the physical constraints on the retaining member 116 based on its location adjacent the body 112 and the cutting element 14. That is, the retaining member 116 may retain its "memory" of the shape it previously had, when in the same phase, as the retaining member 100.

With continued reference to FIG. 6, the retaining member 116 may exert forces 120, 124 on the body 112 and the cutting element 14, respectively. The forces 120, 124 may be exerted based on the tendency of the retaining member 116 to return to the original dimensions of the retaining member 100. The magnitude of the forces 120, 124 may vary based on the dimensions of the retaining member 116 and the magnitude of the deviation from the dimensions of the retaining member 100 in its original state.

Figure 7:
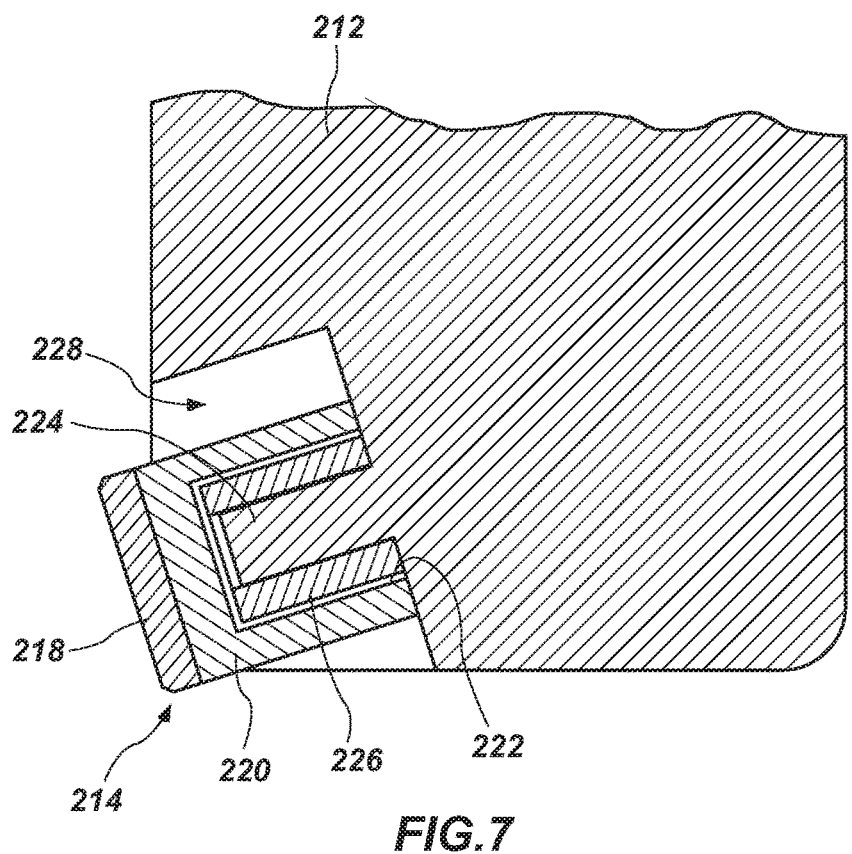
FIGS. 7 and 8 are simplified side cutaway views showing earth-boring tools using shape memory materials to secure cutting elements to a pin on a bit body.

FIG. 7 shows a simplified side cutaway view of another earth-boring tool including a shape memory material. In particular, a bit body 212 may have one or more cutting elements 214 mounted thereon, such as on blades of a fixed-cutter drill bit (e.g., the drill bit 10 shown in FIG. 1). Each cutting element 214 may include a polycrystalline hard material 218, and optionally, a substrate 220, as described previously herein. The substrate 220 may define a cavity 222 therein, which may be used to secure the cutting element 214 to the bit body 212. The bit body 212 may include a pin 224 or other protrusion configured to fit within the cavity 222 in the cutting element 214. A retaining member 226 or fastener including a shape memory material may be disposed within the cavity 222 over or around the pin 224. The retaining member 226 may be as described above with respect to FIGS. 2A through 6. That is, the retaining member 226 may include a material that has been trained or deformed in a first solid phase, inserted into the cavity 222 and over the pin 224, and then transformed to a second solid phase having different dimensions. The retaining member 226 may apply a force to retain the cutting element 214 on the bit body 212.

In some embodiments, the pin 224 may have an outside diameter, for example, from about 0.25 in (6.35 mm) to about 0.5 in (12.7 mm). The cavity 222 may have an inside diameter, for example, from about 0.375 in (9.53 mm) to about 0.625 in (15.9 mm). In such embodiments, the retaining member 226 may, when in the phase shown in FIG. 7, have an inside diameter from about 0.25 in (6.35 mm) to about 0.5 in (12.7 mm) and an outside diameter from about 0.375 in (9.53 mm) to about 0.625 in (15.9 mm), such that the retaining member 226 contacts the outside of the pin 224 and the inside of the cavity 222. The retaining member 226 may have a thickness between about 0.005 in (0.13 mm) to about 0.125 in (3.2 mm). In some embodiments, the retaining member 226 may have a thickness less than about 0.030 in (0.76 mm). The size of the pin 224 and cavity 222 may be any size, so long as the substrate 220 can support the forces acting thereon.

In some embodiments, the dimensions of the pin 224, cavity 222, and retaining member 226 may be selected based on the dimensions and materials of the cutting element 214, the dimensions and materials of the bit body 212, the composition of a formation expected to be encountered in drilling operations, or any other factor.

Figure 8:
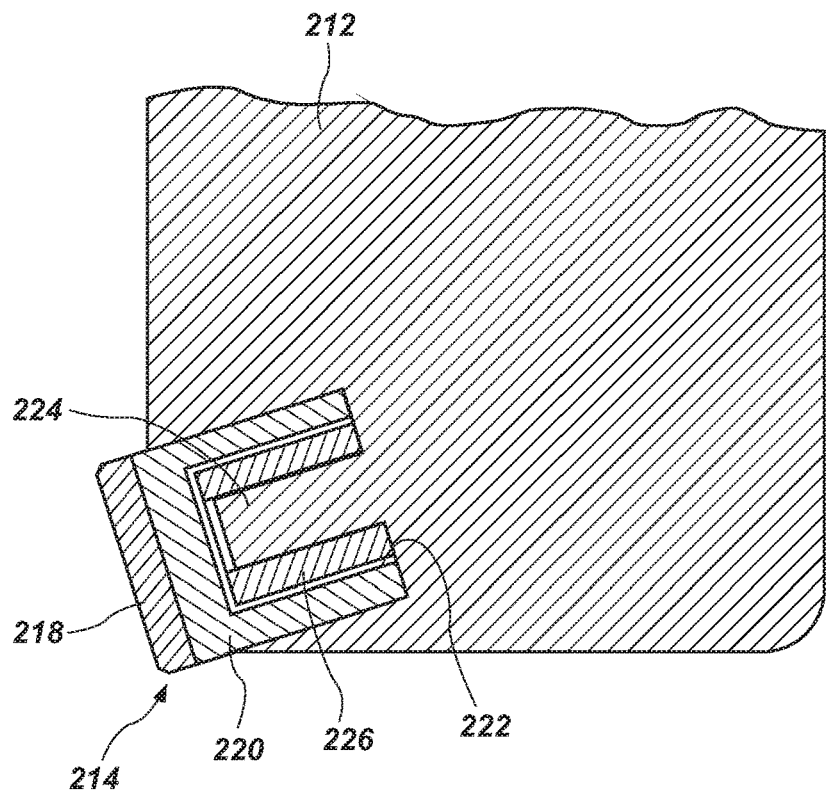

As shown in FIG. 7, there may be a gap 228 between the side of the cutting element 214 (e.g., the outer diameter, if the cutting element 214 is cylindrical) and the bit body 212. That is, the bit body 212 may form a pocket in which the cutting element 214 is disposed, but which does not contact the cutting element 214. In other embodiments, the cutting element 214 may not be in a pocket at all. In other embodiments, and as shown in FIG. 8, the side of the cutting element 214 (e.g., the outer diameter, if the cutting element 214 is cylindrical) may abut the bit body 212 (e.g., in a pocket in the bit body 212). Such a bit body 212 may provide structural support to prevent the portion of the substrate 220 surrounding the pin 224 from deforming due to the outward force of the retaining member 226. When the retaining member 226 expands and pushes outward on the substrate 220, the substrate 220 may be pushed against the surface of the bit body 212.

Figure 9:
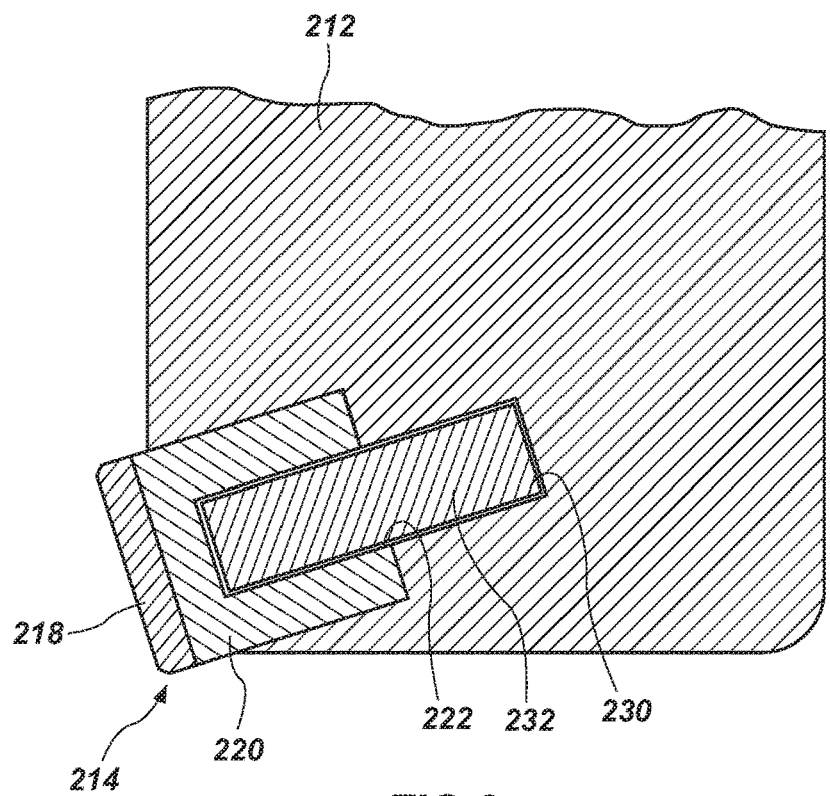
FIG. 9 is a simplified side cutaway view showing an earth-boring tool using a shape memory material as a pin to secure a cutting element to a bit body.

In some embodiments, and as shown in FIG. 9, the bit body 212 may define a cavity 230 into which a pin 232 is inserted. A portion of the pin 232 may also be inserted into the cavity 222 in the cutting element 214. The pin 232 may include a shape memory material, as described herein. Expansion of a dimension of the pin 232 (e.g., a diameter) after a stimulus (e.g., heating) may cause an outward force on both the bit body 212 and the cutting element 214, which may tend to retain the cutting element 214 to the bit body 212. The cavity 230 may be relatively easier to machine than the pin 224 shown in FIGS. 7 and 8, because the cavity 230 may be formed by drilling a hole in the bit body 212. Alternatively, in some embodiments, the cavity 230 may be formed by casting the bit body 212 from a matrix material adjacent a mold.

In some embodiments, the pin 232 may, when in the phase shown in FIG. 9, have an outside diameter, for example, from about 0.315 in (8.0 mm) to about 1.00 in (25.4 mm), such as less than about 0.500 in (12.7 mm). The cavities 222 and 230 may each have an inside diameter matching the outside diameter of the pin 232. In some embodiments, the dimensions of the pin 232 and cavities 222 and 230 may be selected based on the dimensions and materials of the cutting element 214, the dimensions and materials of the bit body 212, the composition of a formation expected to be encountered in drilling operations, or any other factor. The size of the pin 232 and cavities 222 and 230 may be any size, so long as the substrate 220 and bit body 212 can support the forces acting thereon.

Though the pins 224, 232, cavities 222, 230, and retaining member 226 shown in FIG. 7 through 9 are depicted as having generally cylindrical surfaces, these parts may be tapered to allow for easy assembly and disassembly. For example, the interior of the cavities 222, 230 and the exterior of the pins 224, 232 may each have a surface angled from about 0.1° to about 10° from the centerline of the cutting element 214, such as from about 0.5° to about 3°. In some embodiments, interior surfaces of the cavities 222, 230 and exterior surfaces of the pins 224, 232 may have corresponding shapes to aid in retention.

Figure 11:
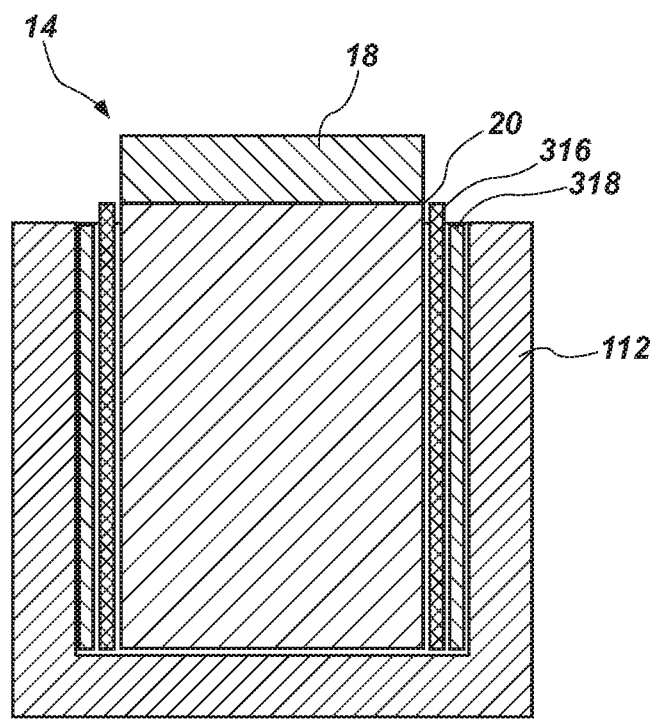
FIGS. 11 and 12 are simplified side cutaway views of an earth-boring tool in which a shape memory material and a filler material are used to secure a cutting element.
Figure 12:
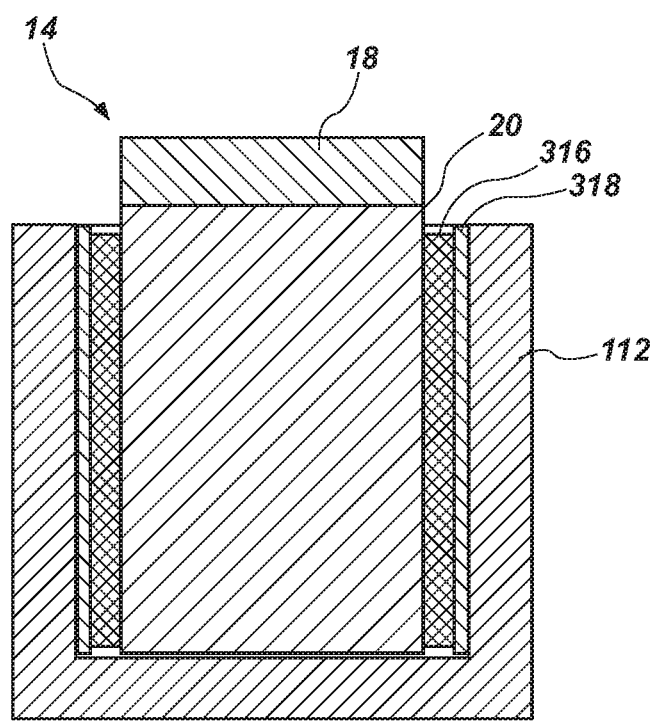

FIGS. 11 and 12 illustrate an embodiment in which a cutting element 14 is secured to a body 112 using a retaining member 316 including a shape memory material and a filler material 318. The filler material 318 may be a material having a melting point below about 300° C., such as a low-temperature alloy. In some embodiments, the filler material 318 may include one or more of metals such as bismuth, antimony, or tin, which may be commercially pure or mixed with other elements. For example, the filler material 218 may include a Sn-based alloy, a Pb-based alloy, an In-based alloy, a Cd-based alloy, a Bi-based alloy, or a Sb-based alloy. The filler material 318 may include a solder material, such as a metal alloy conventionally used to fuse metal objects. In other embodiments, the filler material 318 may include a polymeric material (e.g., an epoxy, a thermoset, etc.). The filler material 318 may be formulated to deform to match the shape of the surfaces of the cutting element 14, the body 112, or the retaining member 316, such as to improve contact between the components. Thus, a filler material 318 may decrease stress concentrations that occur due to surface roughness or a mismatch between shapes of adjacent parts. The use of a filler material 318 may allow parts (including the retaining member 316) to be manufactured with wider tolerance ranges. A filler material 318 may also provide a damping capability to protect the cutting element 14. In some embodiments, the filler material 318 may include more than one type of material, or more than one body, depending on the design of the cutting element 14 and the body 112. Filler materials may also be used in conjunction with other disclosed embodiments, such as those shown in FIGS. 7-9. The filler material 318 may also reduce interface vibration if the filler material has an intermediate acoustic property (i.e., an acoustic property between that of the cutting element 14 and the body 112) to transfer stress waves from a cutting element 14 to the body 112.

The filler material 318 may be disposed adjacent the cutting element 14 and the body 112 in solid or liquid form. For example, the filler material 318 may be inserted as a ring, a sheet, a powder, a paste, or another solid form. In other embodiments, the filler material 318 may be melted, and the molten filler material 318 may be wicked between the cutting element 14 and the body 112.

As discussed above, cutting elements and bit bodies as described may be attached to and/or separated from one another by varying the temperature or providing another stimulus to the shape memory material. Such processes may be performed below decomposition temperatures of the cutting element (typically about 750° C. for polycrystalline diamond cutting elements).

Figure 13:
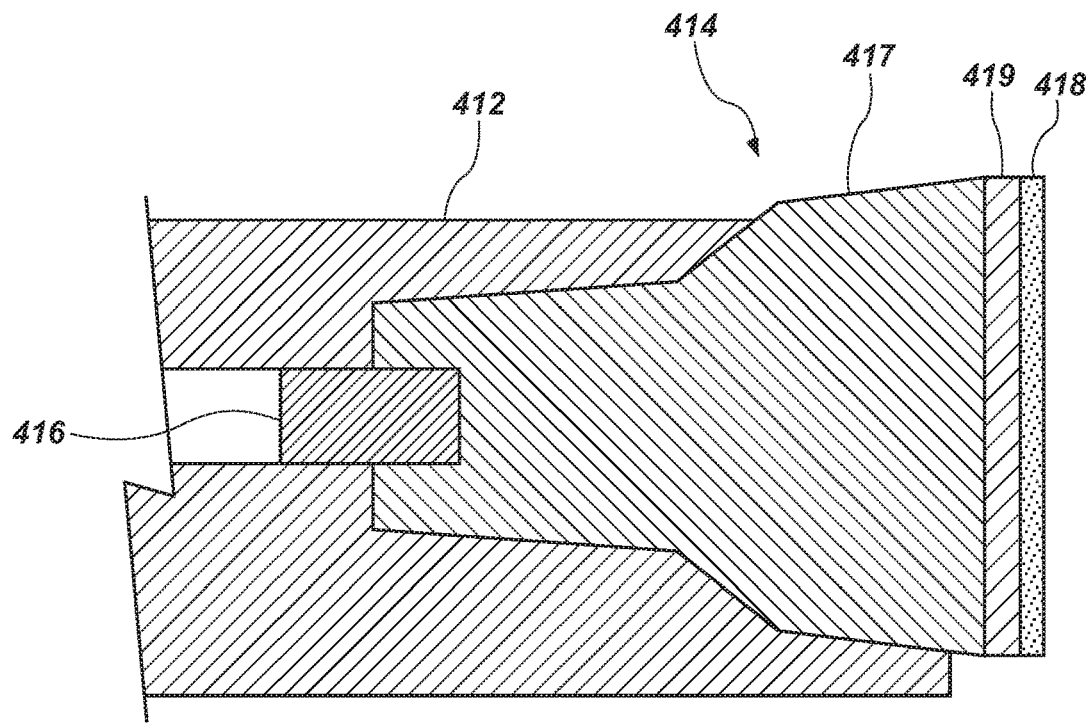
FIGS. 13-15 are simplified side cutaway views illustrating embodiments of cutting elements secured to bodies by a shape memory material in conjunction with an interference fit.
Figure 14:
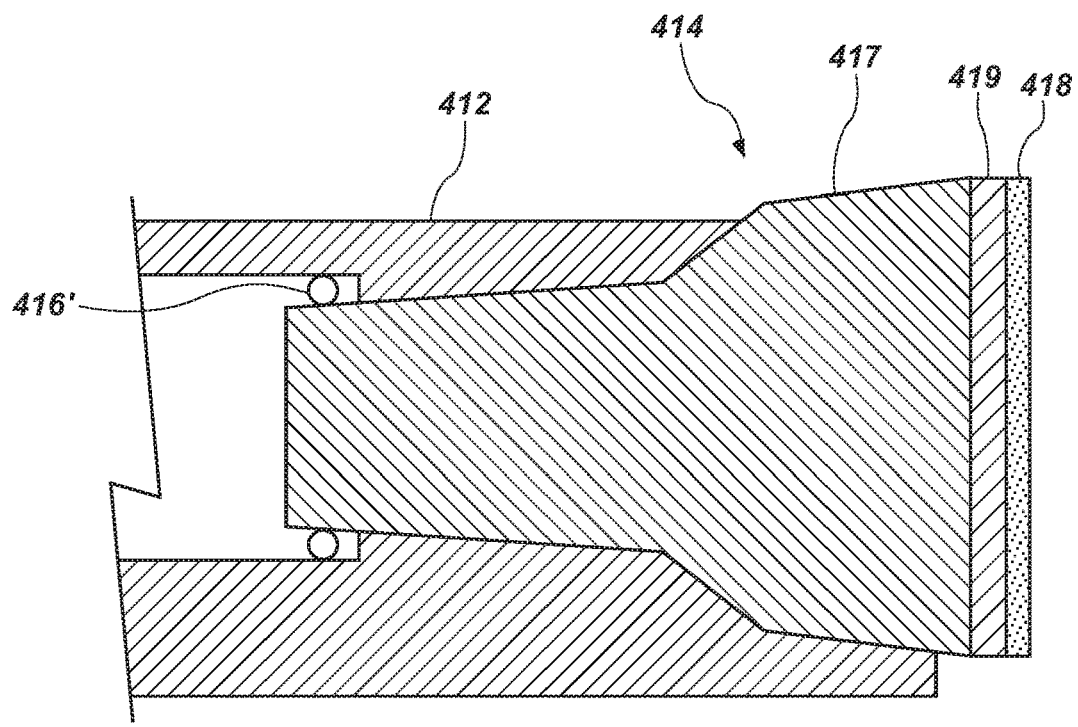
Figure 15:
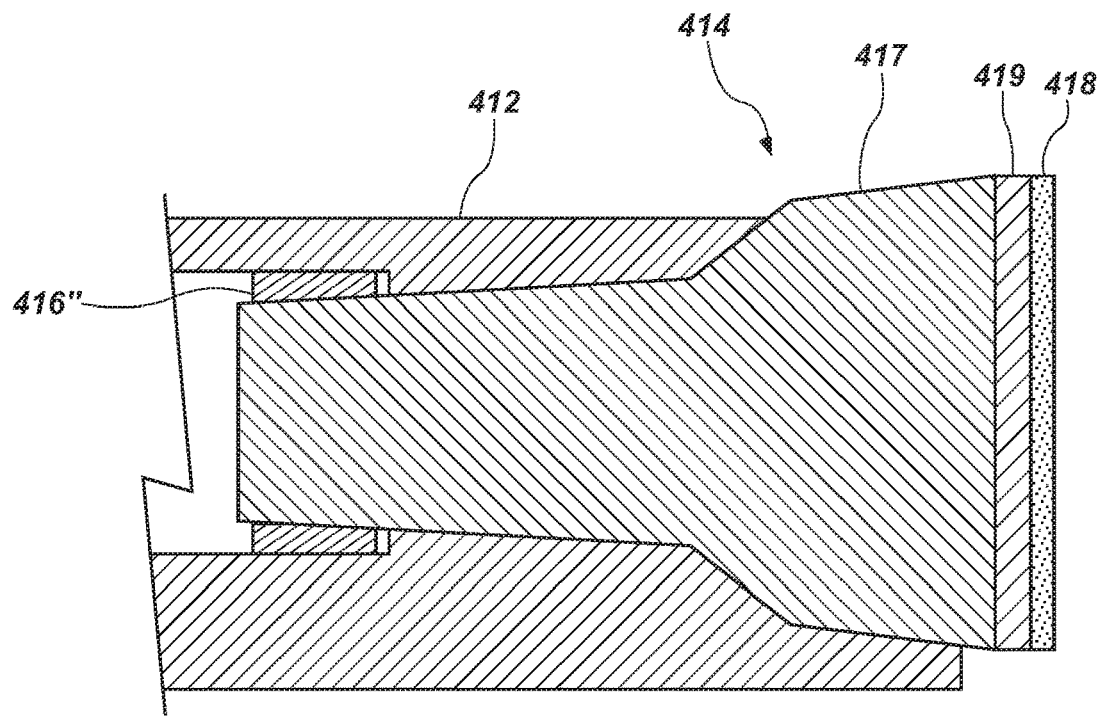

FIGS. 13-15 illustrate embodiments in which cutting elements are secured to a body using a retaining member including a shape memory material in conjunction with an interference fit. For example, as shown in FIG. 13, a cutting element 414 may include a tapered substrate 417 (e.g., a carbide or steel substrate) shaped to fit within an opening or pocket in a body 412 (e.g., a steel body). A polycrystalline hard material 418 may be secured to the substrate 417, such as by an optional carbide or steel backing 419 secured to the tapered substrate 417. The opening in the body 412 may have approximately the same shape as an exterior of the substrate 417, however the taper of the opening may be slightly different (e.g., by about 1°, about 1.5°, about 2°, etc.) from the taper of the substrate 417 to provide an interference fit between the substrate 417 and the body 412 as a force is applied to press the cutting element 414 toward the body 412. That is, the substrate 417, the body 412, or both may elastically deform because the undeformed shapes of the substrate 417 and the body 412 would interfere with one another, or occupy the same volume. This deformation may lead to high friction between the substrate 417 and the body 412, which friction acts counter to a force that tends to move the cutting element 414 and the body 412 with respect to one another. In some embodiments, a temperature difference may be applied to the body 412 and the substrate 417 such when the parts reach equilibrium, a greater retaining force results. For example, before installation, the body 412 may be heated, the substrate 417 may be cooled, or both. Such a process may be referred to in the art as a "shrink fit." The interference fit between the substrate 417 and the body 412 may provide sufficient force to maintain the relative position of the cutting element 414 to the body 412 while a retaining member 416 undergoes a phase transition, as described above. The retaining member 416 may provide an additional force to retain the cutting element 414 in place.

The retaining member 416 may limit or prevent the cutting element 414 from sliding out of the opening in the body 412, such that retaining force due to the interference fit between the taper of the substrate 417 and the taper of the opening remains high. The retention force provided by the retaining member 416 may be particularly beneficial to improve retention for rotational or side loads on the cutting element 414 (i.e., those forces that act in a direction other than the longitudinal direction along the axis of the cutting element 414) or forces in the outward direction from the opening. The combined retaining force provided by the interference fit of the substrate 417 with the body 412 and by the retaining member 416 may thus be greater than the sum of the forces acting alone. As shown in FIG. 13, the retaining member 416 may be in the form of a pin that slides into holes within each of the substrate 417 and the body 412 when in one phase (e.g., martensitic). The material of the retaining member 416 may conform to the holes within the substrate 417 and the body 412 when in another phase (e.g., austenitic), which may improve the alignment of the cutting element 414 with the body 412 and decrease deformation of the body 412 as compared to a cutting element secured by an interference fit alone.

This method of securing the cutting element 414 to the body 412 may obviate the need for brazing the cutting element 414, which is typically costly, time-consuming, and potentially detrimental to the cutting element 414 (e.g., to a diamond table thereon). The combination of a tapered interference fit with the retaining member 416 may enable attachment, rotation and other adjustment, and repair of tools in a wide range of circumstances, even in the field.

In other embodiments, and as shown in FIG. 14, a retaining member 416' may be in the form of a ring surrounding a generally cylindrical portion of the substrate 417. The cutting element 414 may be installed in the body 412 using an interference fit, but without interference from the retaining member 416'. A phase change of the retaining member 416' may cause an interference fit of the retaining member 416' with each of the substrate 417 and the body 412.

As shown in FIG. 15, a retaining member 416" may be in the form of a sheet of material adjacent a generally planar surface of the substrate 417. The body 412 may have a corresponding planar surface. The cutting element 414 may be installed in the body 412 using an interference fit, but initially without interference from the retaining member 416". A phase change of the retaining member 416" may cause an interference fit of the retaining member 416" with each of the substrate 417 and the body 412. In any of the embodiments shown in FIGS. 13-15, a filler material may be used in conjunction with the retaining member 416, as described above with respect to FIGS. 11-12.

Figure 16:
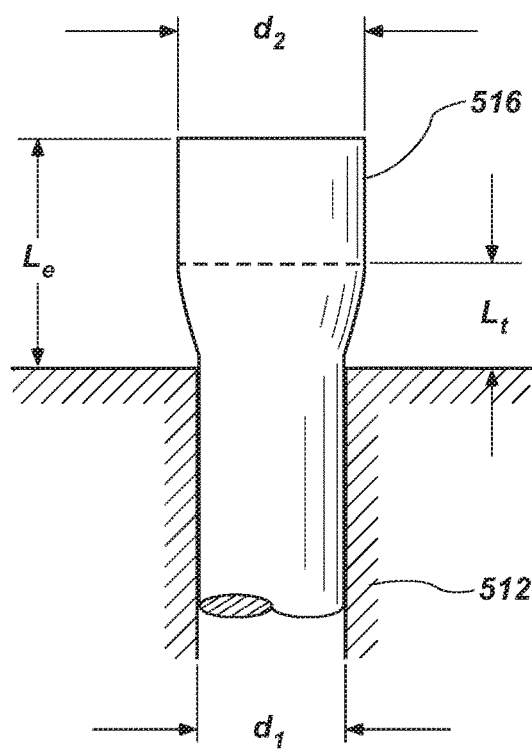
FIGS. 16-19 are simplified side cutaway views illustrating the use of partially constrained shape memory material for securing bodies.

FIG. 16 is a simplified side view illustrating how a retaining member 516 in the form of a pin may appear when subjected to a partial constraint. In a first phase (not shown), the retaining member 516 may be a substantially cylindrical pin that freely slides into and out of a hole in a body 512. After a stimulus, the material of the retaining member 516 may change to a second phase. If the retaining member 516 were entirely unconstrained, the retaining member 516 may be in another substantially cylindrical form, having a larger diameter and a shorter length than when in the first phase. If the retaining member 516 is partially constrained, as shown in FIG. 16, the constrained portion of the retaining member 516 (the lower portion in the orientation of FIG. 16) may have a smaller diameter than the unconstrained portion (the upper portion in the orientation of FIG. 16) of the retaining member 516. For example, the constrained portion may have a first diameter $d_1$, corresponding to the inside diameter of the hole in the body 512, and the unconstrained portion may have a second diameter $d_2$, larger than $d_1$. The retaining member 516 may have a transition region across which the diameter changes from $d_1$ to $d_2$. The transition region may have a length $L_t$ smaller than the exposed length Le of the retaining member 516.

Figure 17:
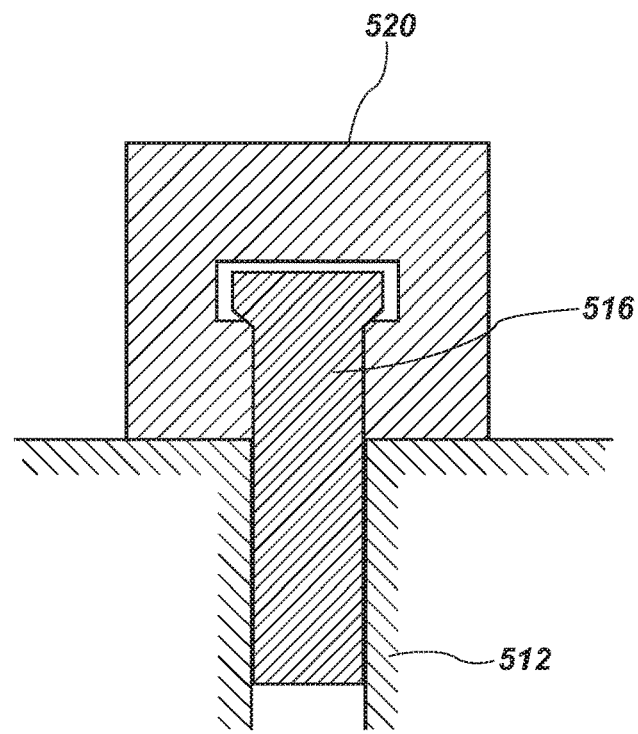

FIG. 17 is a simplified side view illustrating how the retaining member 516 shown in FIG. 16 may be used to join two bodies. A second body 520 may be disposed over the body 512 and the retaining member 516. The second body 520 may define a void into which the retaining member 516 extends. The void may have two or more sections having different diameters (or other lateral dimension, in the void is not round). For example, a lower section (in the orientation of FIG. 17) may have a diameter equal to $d_1$, and an upper section may have a diameter greater than $d_2$ (diameters of the retaining member 516 shown in FIG. 16). Thus, when the retaining member 516 is in the second phase, an upper portion thereof may be unconstrained within the void. The retaining member 516 may therefore form a "mushroomed" shape, having a tapered outer surface. The taper of the retaining member 516 may contribute to the retaining force by creating a mechanical lock between the second body 520 and the retaining member 516, which may be stronger than the friction force between comparable parts of similar dimensions but without the mushroomed shape (e.g., a void of diameter $d_1$ throughout).

Figure 18:
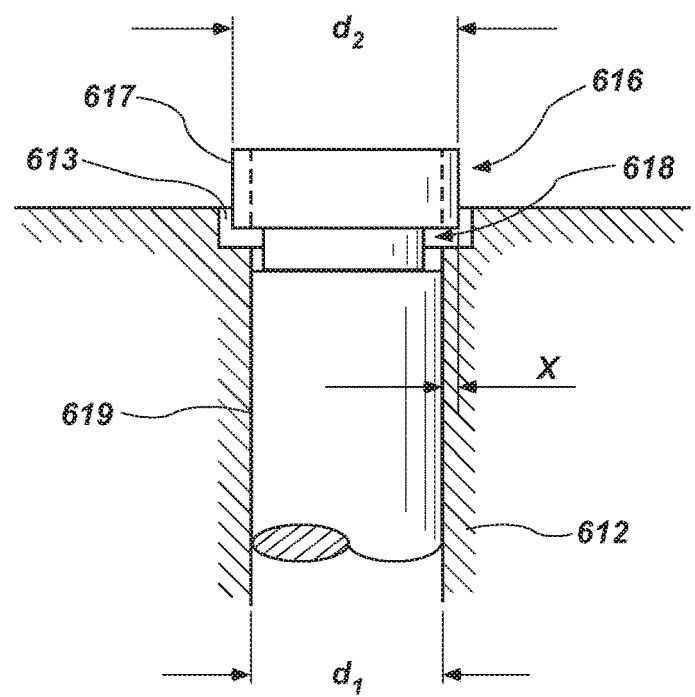

FIG. 18 is a simplified side view illustrating how a retaining member 616 having a groove 618 may react to a partial constraint. In a first phase (not shown), a substantially cylindrical pin may be machined to form the groove 618 and separate an upper section 617 from a lower section 619 of the retaining member 616. The retaining member 616 may freely slide into and out of a hole in a body 612. After a stimulus, the material of the retaining member 616 may change to a second phase. If the lower section 619 of the retaining member 616 is constrained, as shown in FIG. 18, the lower section 619 may have a smaller diameter than the upper section 617. For example, the lower section 619 may have a first diameter $d_1$, corresponding to the inside diameter of the hole in the body 612, and the upper section 617 may have a second diameter $d_2$, larger than $d_1$. The groove 618 may decouple strain between the upper section 617 and the lower section 619 and enable the lower section 619 and the upper section 617 to each have approximately uniform diameters, without a tapered transition region in between (in contrast with retaining member 516 shown in FIGS. 16-17). The larger-diameter upper section 617 may mechanically lock the retaining member 616 in the hole in the body 612 (i.e., the retaining member 616 cannot be pushed downward, in the orientation of FIG. 18) through the hole due to the interference x between the outer portion of the upper section 617 and the body 612. In some embodiments, a shoulder 613 having a diameter larger than $d_2$ may be formed in the body 612.

Figure 19:
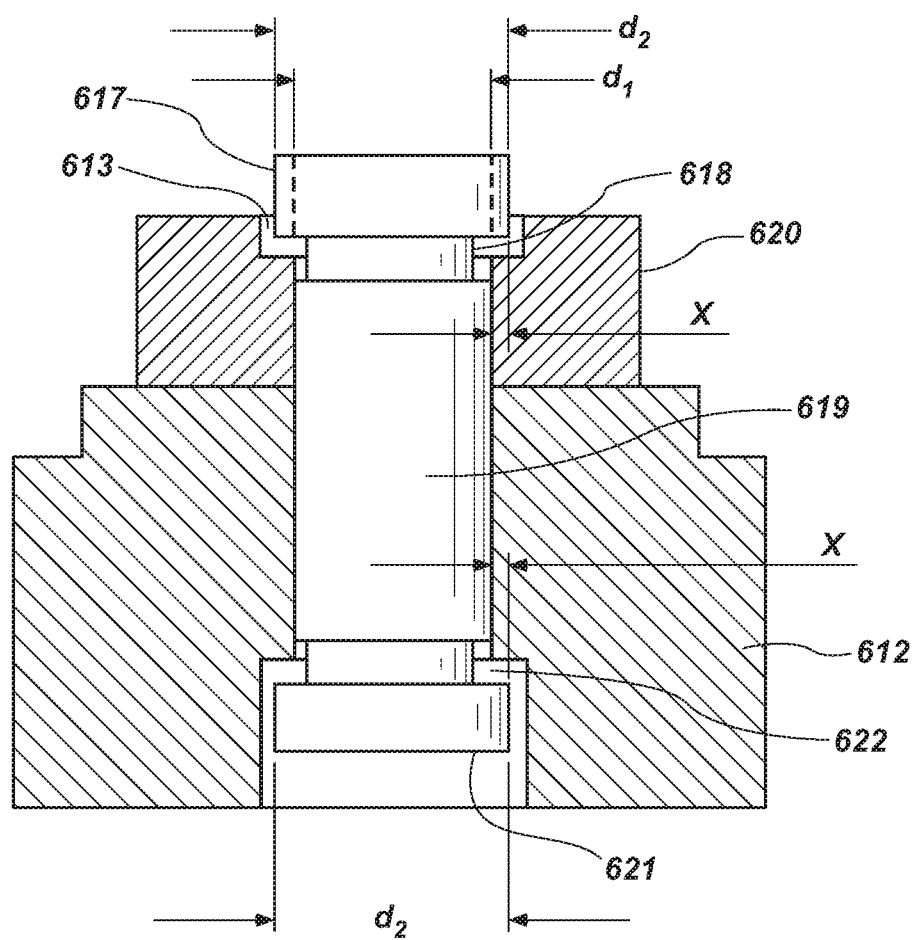

FIG. 19 is a simplified side view illustrating how the retaining member 616 shown in FIG. 18 may be used to join two bodies. A second body 620 may be disposed over the body 612 and the retaining member 616. Furthermore, the retaining member 616 may include multiple grooves 618, 622. The second body 620 may have a hole into which the retaining member 616 extends. The hole may have two or more sections having different diameters. For example, a lower section (in the orientation of FIG. 19) may have a diameter equal to $d_1$, and an upper section may have a diameter greater than dz. Thus, when the retaining member 616 is in the second phase, the upper section 617 thereof may be radially unconstrained, locking the retaining member 616 to the second body 620. The hole in the body 612 may have similar features, such that another section 621 of the retaining member 616 is unconstrained and locks with the body 612. The interference x between the unconstrained sections 617, 621 of the retaining member 616 and the body 612 and second body 620 may prevent separation of the second body 620 from the body 612 while the retaining member 616 is in the second phase.

As shown in FIGS. 16-19, partially constraining a shape memory material may produce a surface having a stepped structure, which may be beneficial for providing an improved retaining force in comparison to a retaining member without a stepped structure. Shape memory materials may provide wider design options and exhibit greater reliability than conventional shrink-fit methods. For example, shrink-fit parts may typically be designed to have approximately 0.001" of interference per 1" of length (i.e., 0.1%). Shrink-fit methods rely on thermal expansion, which may be in the range of about 0.00001/° C. The magnitude of recoverable strain of shape memory materials may be much larger, even up to 10%. Furthermore, complicated shapes may be formed from shape memory materials, in contrast to cylindrical parts typically used for shrink-fitting. Finally, retaining members formed from shape memory materials having two-way shape memory may be removed and adjusted, such as to change the position of parts. In any of the embodiments shown in FIGS. 16-19, a filler material may be used in conjunction with the retaining member 516, 616, as described above with respect to FIGS. 11-12.

Shape memory materials may be used alone as retaining members, or in conjunction with other retaining mechanisms (e.g., an interference fit, as shown and described with respect to FIGS. 13-15, brazing, etc.). Combinations of a shape memory material with other retaining mechanisms may produce devices having a higher strength than devices formed with conventional retaining mechanisms alone.

Figure 20:
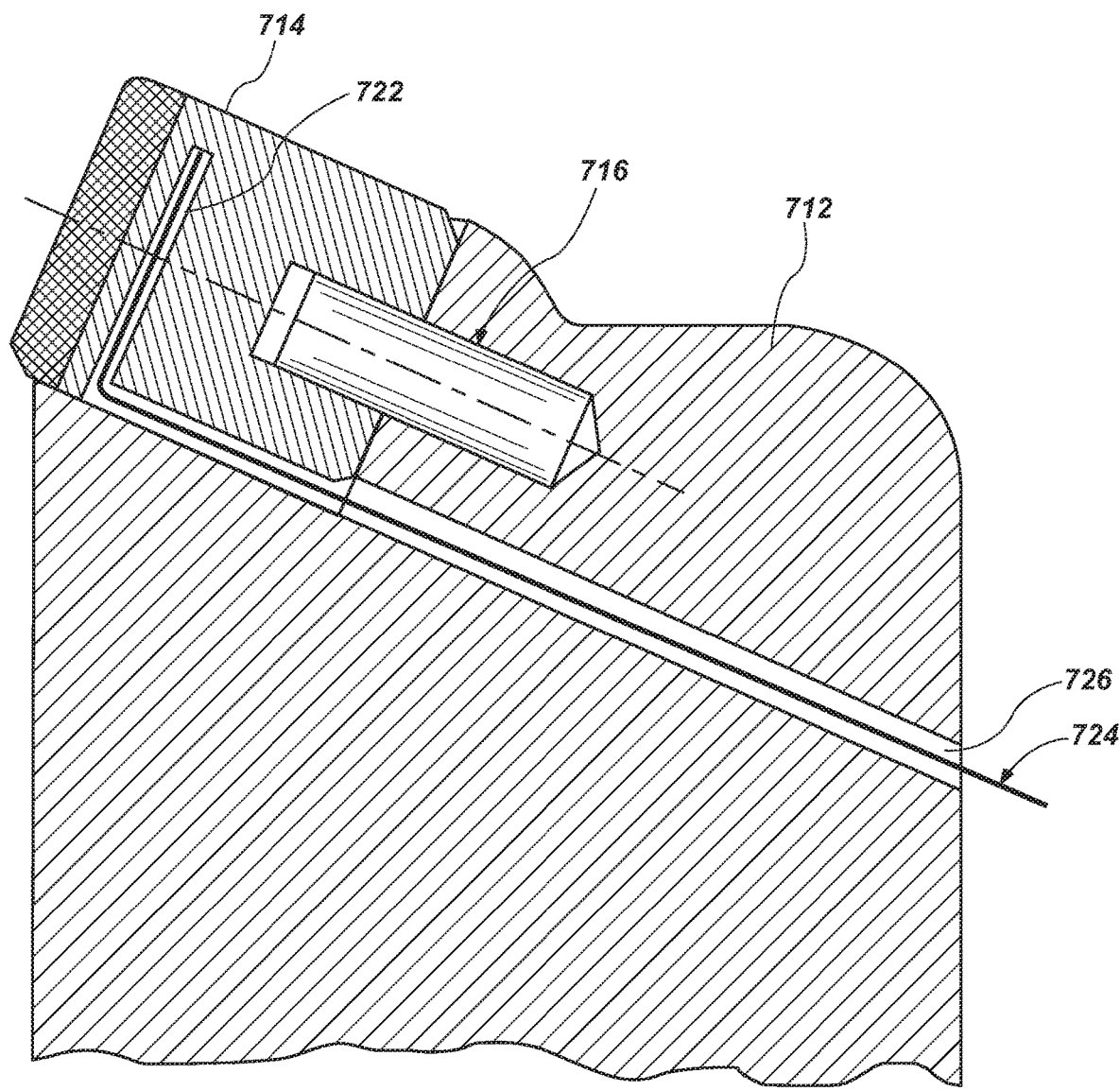
FIG. 20 is a simplified cross-sectional side view illustrating a shape memory material securing a cutting element containing a sensor to a bit body.

FIG. 20 is a simplified cross-sectional side view illustrating one application in which shape memory material may be beneficially used as a retaining member. As shown, a retaining member 716 may be used to secure a cutting element 714 to a bit body 712, in a manner similar to that shown in FIG. 9. The cutting element 714 may include a sensor 722 therein for detecting conditions to which the cutting element 714 is exposed. For example, the sensor 722 may include a thermocouple, a strain gauge, a pressure transducer, etc. A wire 724 may connect the sensor 722 to another component (e.g., a processor) through a channel 726 in the bit body 712. The wire 724 and the sensor 722 may be relatively sensitive to temperature extremes, and therefore brazing the cutting element 714 to the bit body 712 may be impractical. Use of a retaining member 716 as described herein may enable attachment of the cutting element 714 to the bit body 712 without damaging the sensor 722.

Figure 21:
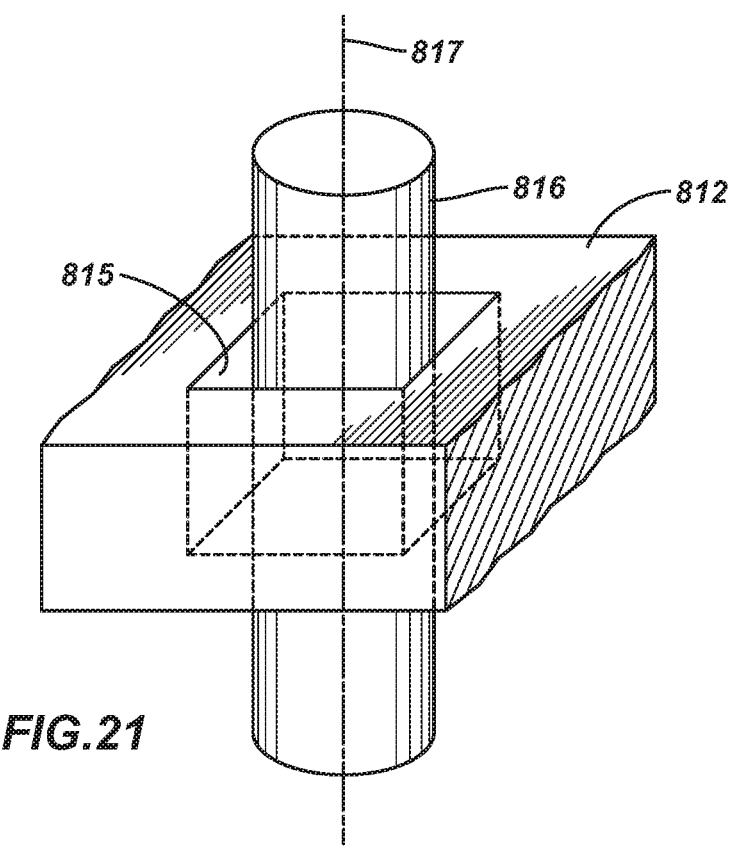
FIG. 21 is an isometric view illustrating an exemplary retaining member disposed within a hole in a body, wherein the hole presents a rectangular cross-sectional shape and the cross-sectional shape of the retaining member is circular.
Figure 22:
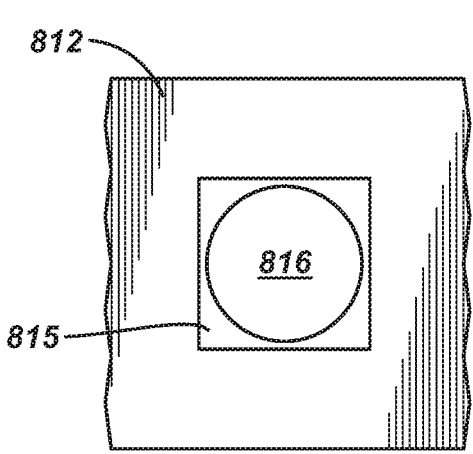
FIG. 22 is a plan view of the arrangement shown in FIG. 21.
Figure 23:
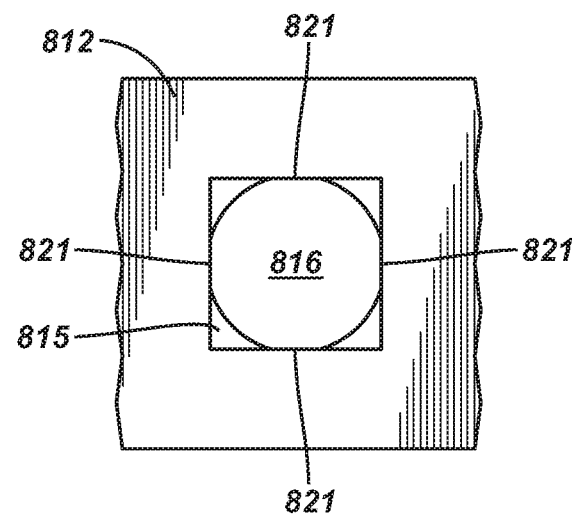
FIG. 23 is a plan view of the arrangement of FIGS. 21-22, following a phase change for the retaining member to secure it within the hole.

FIGS. 21-23 illustrate a further fastening apparatus application wherein a retaining member 816, which is formed of shape memory material, is disposed within a hole 815 within body 812. An axis 817 passes along the axial dimension of the retaining member 816. It is noted that the retaining member 816 is cylindrically-shaped and presents an axial cross-section (a cross-section taken normal to the axis 817) that is circular in shape. In alternative embodiments, the axial cross-section can be any polygonal or non-circular shape. The hole 815 has a cross-section in the same axial dimension which is preferably rectangular and, more preferably, square, in shape. In other embodiments, the axial cross-section of the hole 815 can be any polygonal or non-circular shape. FIGS. 21-22 depict the retaining member 816 having been inserted into the hole 815. Upon insertion, the retaining member 816 fits loosely within the hole 815, as best shown in FIG. 22. FIG. 23 depicts the retaining member 816 now having undergone a phase change so that it expands radially. The radial expansion creates four side contact points 821 wherein the retaining member 816 forms an interference fit with the hole 815. The side contact points 821 secure the retaining member 816 against axial forces as well as torsional forces. It is noted that the retaining member 816 may be similar to the retaining member 516 in that it includes a similar taper and would therefore form a "mushroomed" shape upon phase change.

Figure 24:
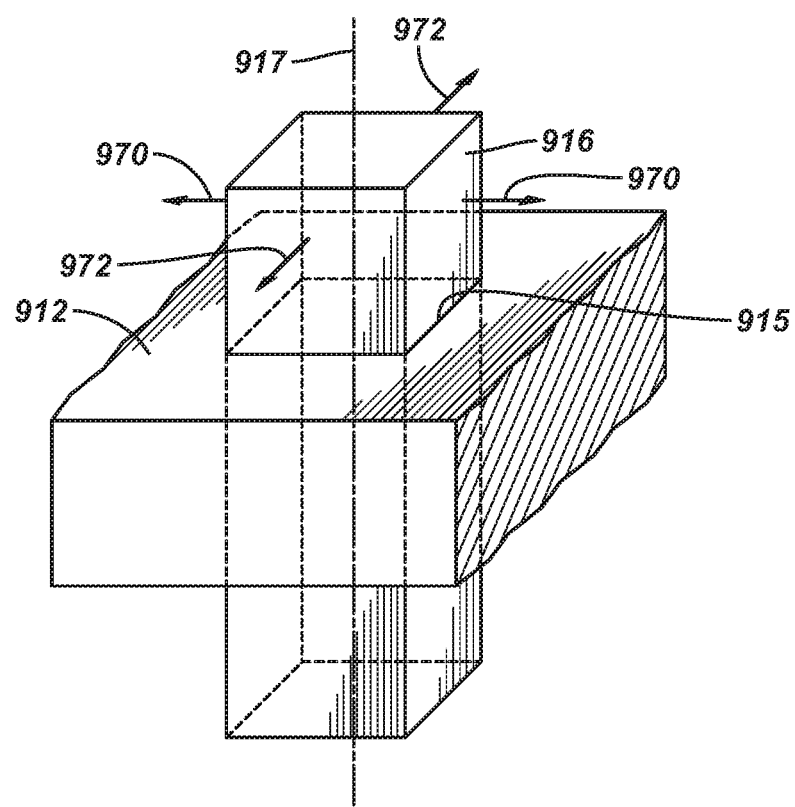
FIG. 24 is an isometric view illustrating an exemplary retaining member disposed within a hole in a body, wherein the hole and the retaining member both present a rectangular cross-sectional shape.

FIG. 24 depicts an alternative fastening apparatus application wherein a retaining member 916, which is formed of shape memory material, is disposed within hole 915 within body 912. The retaining member 916 has axis 917. The retaining member 916 has a first axial cross-sectional shape, and the hole 915 presents a second axial cross-sectional shape that are each rectangular, and preferably square, in shape. As with the previously described retaining member 816, the retaining member 916 is initially disposed within the hole 915 so that it fits loosely within the hole 915. Following a phase change, the retaining member 916 is expanded both in width (see arrows 970) and in depth (arrows 972). This expansion will lock the retaining member 916 within the hole 915 against rotational movement as well as axial movement (such as movement to withdraw the retaining member 916 from the hole 915.

Though generally described with respect to cutting elements, retaining members including shape memory materials are not so limited. Such materials may be used for any application in which strong fastening is desired with wide flexibility in the shape of the fastener. For example, the methods and materials disclosed may be used for assembling downhole tools of any variety, industrial machinery, automobiles, electronics, etc.

Additional non-limiting example embodiments of the disclosure are described below.

Embodiment 1

An earth-boring tool, comprising a tool body, at least one cutting element, and a retaining member comprising a shape memory material located between a surface of the tool body and a surface of the at least one cutting element. The shape memory material is configured to transform, responsive to application of a stimulus, from a first solid phase to a second solid phase. The retaining member comprises the shape memory material in the second solid phase, and at least partially retains the at least one cutting element adjacent the tool body.

Embodiment 2

The earth-boring tool of Embodiment 1, wherein the at least one cutting element comprises a diamond table secured to a substrate.

Embodiment 3

The earth-boring tool of Embodiment 2, wherein the substrate defines a cavity in which at least a portion of the retaining member is disposed.

Embodiment 4

The earth-boring tool of any of Embodiments 1 through 3, wherein the retaining member comprises at least one annular sleeve.

Embodiment 5

The earth-boring tool of Embodiment 4, wherein the at least one annular sleeve surrounds the at least one cutting element.

Embodiment 6

The earth-boring tool of any of Embodiments 1 through 5, wherein the application of a stimulus comprises heating the shape memory material above a preselected temperature.

Embodiment 7

The earth-boring tool of any of Embodiments 1 through 6, wherein the shape memory material is configured to transform from the second solid phase to the first solid phase to release the at least one cutting element responsive to another stimulus.

Embodiment 8

The earth-boring tool of Embodiment 7, wherein the another stimulus comprises cooling the shape memory material below another preselected temperature.

Embodiment 9

The earth-boring tool of any of Embodiments 1 through 8, wherein the shape memory material comprises an alloy selected from the group consisting of Ni-based alloys, Cu-based alloys, Co-based alloys, Fe-based alloys, Ti-based alloys, Al-based alloys, and mixtures thereof.

Embodiment 10

The earth-boring tool of any of Embodiments 1 through 8, wherein the shape memory material comprises a polymer.

Embodiment 11

The earth-boring tool of any of Embodiments 1 through 10, further comprising a filler material adjacent the retaining member, the filler material configured to at least substantially fill a cavity between the retaining member at least one of the surface of the cutting element and the surface of and the tool body.

Embodiment 12

The earth-boring tool of Embodiment 11, wherein the shape memory material comprises a metal alloy, and wherein the filler material has a melting point less than an austenitic phase transition temperature of the shape memory material.

Embodiment 13

The earth-boring tool of Embodiment 11 or Embodiment 12, wherein the filler material has a melting point less than about 300° C.

Embodiment 14

The earth-boring tool of any of Embodiments 11 through 13, wherein the filler material comprises at least one of Bi, Sb, Sn, an Sn-based alloy, a Pb-based alloy, an In-based alloy, a Cd-based alloy, a Bi-based alloy, or an Sb-based alloy.

Embodiment 15

A method of forming an earth-boring tool, comprising disposing a retaining member comprising a shape memory material in a space between a cutting element and a tool body; and transforming the shape memory material from a first solid phase to a second solid phase by application of a stimulus to cause the retaining member to create a mechanical interference between the cutting element, the retaining member, and the tool body to secure the cutting element to the tool body.

Embodiment 16

The method of Embodiment 15, wherein disposing a retaining member in a space between a cutting element and a tool body comprises disposing the retaining member in a cavity within the cutting element.

Embodiment 17

The method of Embodiment 15 or Embodiment 16, wherein disposing a retaining member in a space between a cutting element and a tool body comprises disposing the retaining member in a cavity within the tool body.

Embodiment 18

The method of any of Embodiments 15 through 17, wherein disposing a retaining member in a space between a cutting element and a tool body comprises disposing at least one annular sleeve in the space.

Embodiment 19

The method of Embodiment 18, wherein disposing at least one annular sleeve in the space comprises disposing the at least one annular sleeve around the cutting element.

Embodiment 20

The method of any of Embodiments 15 through 19, wherein disposing a retaining member in a space between a cutting element and a tool body comprises disposing at least one cylindrical retaining member in the space.

Embodiment 21

The method of any of Embodiments 15 through 20, further comprising applying another stimulus to the shape memory material to release the at least one cutting element from the tool body.

Embodiment 22

The method of Embodiment 21, wherein applying a stimulus to the shape memory material comprises cooling the shape memory material below a preselected temperature.

Embodiment 23

The method of any of Embodiments 15 through 22, further comprising training the shape memory material before disposing the retaining member in the space.

Embodiment 24

The method of any of Embodiments 15 through 23, wherein the stimulus comprises a thermal stimulus.

Embodiment 25

The method of any of Embodiments 15 through 24, wherein the shape memory material comprises an alloy, wherein transforming the shape memory material from a first solid phase to a second solid phase by application of a stimulus comprises converting the alloy from a martensitic phase to an austenitic phase.

Embodiment 26

The method of any of Embodiments 15 through 25, further comprising disposing a filler material adjacent the retaining member prior to transforming the shape memory material from the first solid phase to the second solid phase.

Embodiment 27

A method of forming an earth-boring tool, comprising training a shape memory material in a first solid phase to a first shape, training the shape memory material in a second solid phase to a second shape such that the retaining member comprising the shape memory material exhibits a dimension larger in at least one direction than in the at least one direction when in the first solid phase, transforming the shape memory material to the first solid phase, disposing the retaining member comprising the shape memory material in the first solid phase at least partially within a space between a cutting element and a tool body, and transforming the shape memory material to the second solid phase to secure the cutting element to the tool body.

Embodiment 28

The method of Embodiment 27, wherein disposing the retaining member comprising the shape memory material in the first solid phase at least partially within the space comprises placing the cutting element within a sleeve comprising the shape memory material.

Embodiment 29

The method of Embodiment 27, wherein disposing the retaining member comprising the shape memory material in the first solid phase at least partially within the space comprises disposing the retaining member comprising the shape memory material within each of a first cavity within the cutting element and a second cavity within the tool body.

Embodiment 30

The method of Embodiment 27, further comprising disposing the retaining member around a pin extending from a surface of the tool body.

Embodiment 31

The method of any of Embodiments 27 through 30, wherein transforming the shape memory material to the second solid phase comprises causing the retaining member to apply a force normal to a surface of each of the cutting element and the tool body.

Embodiment 32

The method of any of Embodiments 27 through 31, wherein transforming the shape memory material to the first solid phase comprises cooling the shape memory material.

Embodiment 33

The method of any of Embodiments 27 through 32, wherein transforming the shape memory material to the second solid phase comprises heating the shape memory material.

Embodiment 34

The method of any of Embodiments 27 through 33, further comprising selecting the shape memory material to comprise an alloy selected from the group consisting of Ni-based alloys, Cu-based alloys, Co-based alloys, Fe-based alloys, Ti-based alloys, Al-based alloys, and mixtures thereof.

Embodiment 35

The method of any of Embodiments 27 through 34, further comprising selecting the shape memory material to comprise a polymer.

Embodiment 36

A tool for forming or servicing a wellbore, comprising a first body, a second body, and a retaining member located between a surface of the first body and a surface of the second body. The retaining member at least partially retains the second body with respect to the first body. The retaining member comprises a shape memory material configured to transform, responsive to application of a stimulus, from a first solid phase to a second solid phase.

Embodiment 37

The tool of Embodiment 36, wherein the retaining member comprises a cylindrical body when in the first solid phase.

Embodiment 38

The tool of Embodiment 36 or Embodiment 37, wherein at least a portion of the retaining member is physically constrained when the shape memory material is in the second solid phase.

Embodiment 39

The tool of Embodiment 38, wherein a portion of the retaining member is physically unconstrained when the shape memory material is in the second solid phase.

Embodiment 40

The tool of any of Embodiments 36 through 39, wherein the shape memory material is configured to transform from the second solid phase to the first solid phase to release the second body from the first body responsive to another stimulus.

Embodiment 41

The tool of any of Embodiments 36 through 40, wherein the shape memory material comprises at least one material selected from the group consisting of Ni-based alloys, Cu-based alloys, Co-based alloys, Fe-based alloys, Ti-based alloys, and Al-based alloys.

Embodiment 42

The tool of any of Embodiments 36 through 40, wherein the shape memory material comprises at least one material selected from the group consisting of epoxy polymers, thermoset polymers, and thermoplastic polymers.

Embodiment 43

The tool of any of Embodiments 36 through 41, further comprising a sensor disposed within an opening in at least one of the first body or the second body.

Embodiment 44

A method of forming a tool for forming or servicing a wellbore. The method comprises disposing a retaining member comprising a shape memory material in a space between a first body and a second body, and transforming the shape memory material from a first solid phase to a second solid phase by application of a stimulus to cause the retaining member to create a mechanical interference between the first body, the retaining member, and the second body to secure the first body to the second body.

Embodiment 45

The method of Embodiment 44, wherein transforming the shape memory material from a first solid phase to a second solid phase comprises constraining at least a portion of the shape memory material.

Embodiment 46

The method of Embodiment 44 or Embodiment 45, wherein transforming the shape memory material from a first solid phase to a second solid phase comprises forming an unconstrained portion of the shape memory material.

Embodiment 47

The method of any of Embodiments 44 through 46, further comprising forming a groove in the retaining member.

Embodiment 48

The method of any of Embodiments 44 through 47, further comprising pressing the first body into an opening within the second body.

Embodiment 49

The method of any of Embodiments 44 through 48, wherein transforming the shape memory material from a first solid phase to a second solid phase comprises applying a thermal, electrical, magnetic, or chemical stimulus.

Embodiment 50

The method of any of Embodiments 44 through 49, further comprising training the shape memory material before disposing the retaining member in the space.

Embodiment 51

The method of any of Embodiments 44 through 50, wherein the shape memory material comprises an alloy, and wherein transforming the shape memory material from a first solid phase to a second solid phase by a stimulus comprises converting the alloy from a martensitic phase to an austenitic phase.

Embodiment 52

The method of any of Embodiments 44 through 51, further comprising disposing a filler material adjacent the retaining member prior to transforming the shape memory material from the first solid phase to the second solid phase.

Embodiment 53

A fastening apparatus, comprising a body comprising a shape memory material. The body has at least a first cross sectional area and a second cross sectional area measured perpendicular to a longitudinal axis of the body. The second cross sectional area is smaller than the first circular cross sectional area. The shape memory material is configured to transform, responsive to application of a stimulus, from a first solid phase to a second solid phase.

Embodiment 54

The fastening apparatus of Embodiment 53, wherein the shape memory material comprises an alloy.

Embodiment 55

The fastening apparatus of Embodiment 53, wherein the shape memory material comprises a polymer.

Embodiment 56

The fastening apparatus of any of Embodiments 53 through 55, wherein the body has a third cross sectional area measured perpendicular to the longitudinal axis of the body, wherein the second cross sectional area is between the first cross sectional area and the third cross sectional area, and wherein the first cross sectional area is equal to the third cross sectional area.

Embodiment 57

The fastening apparatus of any of Embodiments 53 through 56, wherein at least one of the first cross sectional area and the second cross sectional comprises a circular cross section.

While the present disclosure may be susceptible to various modifications and alternative forms, specific embodiments have been shown by way of example in the drawings and have been described in detail herein. However, it should be understood that the disclosure is not limited to the particular forms disclosed. Rather, the disclosure includes all modifications, equivalents, legal equivalents, and alternatives falling within the scope of the disclosure as defined by the appended claims. Further, embodiments of the disclosure have utility with different and various tool types and configurations.

What is claimed is:

1. A fastening apparatus, comprising:
    a retaining member comprising a shape memory material, the retaining member having an axial cross-section of a first cross-sectional shape, the retaining member comprising a cutting element for a drill bit;
    a hole within a bit body into which the retaining member is disposed, the hole having an axial cross-section of a second cross-sectional shape;
    wherein the shape memory material is configured to transform, responsive to application of a stimulus, from a first solid phase to a second solid phase; and
    transformation of the shape memory material to the second solid phase will secure the retaining member within the hole against rotational and axial movement by creating mechanical interference between the shape memory material and each of the bit body and the cutting element to at least partially retain the cutting element in position on the bit body and resist rotational and axial movement of the cutting element when drilling a formation.

2. The fastening apparatus of claim 1, wherein the second cross-sectional shape is non-circular.

3. The fastening apparatus of claim 2, wherein the first cross-sectional shape is rectangular.

4. The fastening apparatus of claim 3, wherein the second cross-sectional shape is square.

5. The fastening apparatus of claim 1, wherein the first cross-sectional shape is circular.

6. The fastening apparatus of claim 1, wherein the first cross-sectional shape is non-circular.

7. The fastening apparatus of claim 6, wherein the first cross-sectional shape is rectangular.

8. The fastening apparatus of claim 7, wherein the first cross-sectional shape is square.

9. The fastening apparatus of claim 1, wherein the retaining member is secured against rotation and axial movement by a plurality of side contact points which provided an interference fit between the retaining member and the hole.

10. The fastening apparatus of claim 1 wherein:
    the shape memory material comprises a shape memory metal alloy.

11. A method of forming a tool for forming or servicing a wellbore, the method comprising:

disposing a retaining member comprising a shape memory material in a hole within a bit body, the retaining member comprising a cutting element for a drill bit and presenting an axial cross-section of a first shape, and the hole presenting an axial cross-section of a rectangular second shape; and transforming the shape memory material from a first solid phase to a second solid phase by application of a stimulus to cause the retaining member to create a mechanical interference between the retaining member and the body to secure the retaining member against rotational and axial movement by creating mechanical interference between the shape memory material and each of the bit body and the cutting element to at least partially retain the cutting element in position on the bit body and resist rotational and axial movement of the cutting element when drilling a formation.

12. The method of claim 11, wherein transforming the shape memory material from a first solid phase to a second solid phase comprises applying a thermal, electrical, magnetic, or chemical stimulus.

13. The method of claim 11 wherein:
the shape memory material comprises a shape memory metal alloy.

14. A fastening apparatus, comprising:
a cutting element for a drill bit comprising a shape memory metal alloy, the cutting element having an axial cross-section of a first cross-sectional shape;
a hole within a drill bit body into which the cutting element is disposed, the hole having an axial cross-section of a second cross-sectional shape;
wherein the shape memory metal alloy is configured to transform, responsive to application of a stimulus, from a first solid phase to a second solid phase; and
transformation of the shape memory metal alloy to the second solid phase will secure the cutting element within the hole against rotational and axial movement.

15. The fastening apparatus of claim 14 wherein the shape memory metal alloy is an alloy from the group consisting of: Ni-based alloys, Cu-based alloys, Co-based alloys, Fe-based alloys, Ti-based alloys, Al-based alloys and any mixture thereof.

16. The fastening apparatus of claim 14 wherein the shape memory metal alloy is an alloy from the group consisting of: a 50:50 mixture by weight of nickel and titanium, a 55:45 mixture by weight of nickel and titanium, and a 60:40 mixture by weight of nickel and titanium.

* * * * *